United States Patent
Lee et al.

(10) Patent No.: US 8,625,723 B2
(45) Date of Patent: Jan. 7, 2014

(54) METHOD AND APPARATUS FOR PERFORMING DEMAPPING IN WIRELESS COMMUNICATION SYSTEM

(75) Inventors: Wookbong Lee, Anyang-si (KR); Inuk Jung, Anyang-si (KR); Jinsam Kwak, Anyang-si (KR); Kiseon Ryu, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/410,484

(22) Filed: Mar. 2, 2012

(65) Prior Publication Data

US 2012/0224660 A1 Sep. 6, 2012

Related U.S. Application Data

(60) Provisional application No. 61/448,663, filed on Mar. 3, 2011, provisional application No. 61/449,040, filed on Mar. 3, 2011.

(30) Foreign Application Priority Data

Feb. 20, 2012 (KR) .................. 10-2012-0016937

(51) Int. Cl.
*H04L 27/06* (2006.01)

(52) U.S. Cl.
USPC ........... 375/341; 375/220; 375/262; 375/316; 375/340; 329/349; 329/353; 714/794; 714/795; 714/796; 370/335; 370/342

(58) Field of Classification Search
USPC .......... 375/220, 262, 316, 341; 329/349, 353; 714/794, 795, 796; 370/335, 342
See application file for complete search history.

(56) References Cited

U.S. PATENT DOCUMENTS 8,165,189 B2 * 4/2012 Liu et al. ................. 375/220
2009/0274235 A1 * 11/2009 Lee et al. ................. 375/267

* cited by examiner

*Primary Examiner* — Leon Flores
(74) *Attorney, Agent, or Firm* — Morgan, Lewis & Bockius LLP

(57) ABSTRACT

A method and apparatus for performing demapping in a wireless communication system utilizing a modulo operation are disclosed. The demapping method of a receiver in a wireless communication system includes receiving an input signal and first information indicating whether a first modulo operation is performed on the input signal from a transmitter; if the first information indicates execution of the first modulo operation, performing a second modulo operation of the input signal, and acquiring a reception signal; generating a maximum function value having a highest probability that the reception signal corresponds to a candidate constellation point of an extended constellation; and generating a log-likelihood ratio (LLR) using the generated maximum function value.

18 Claims, 30 Drawing Sheets

FIG. 5
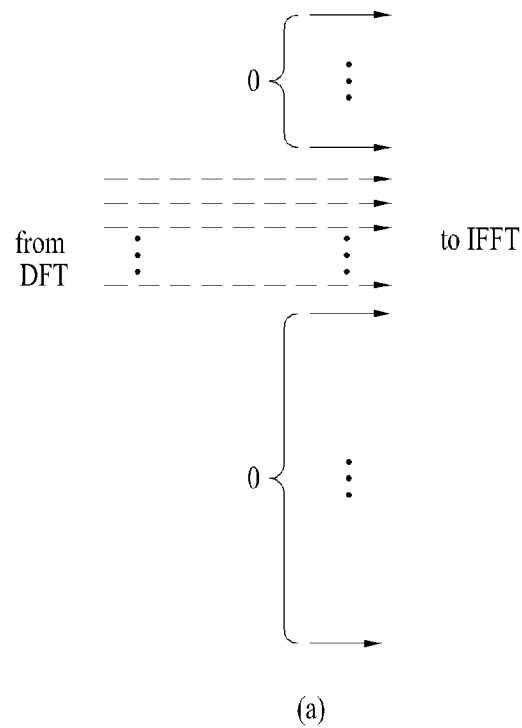
(a)
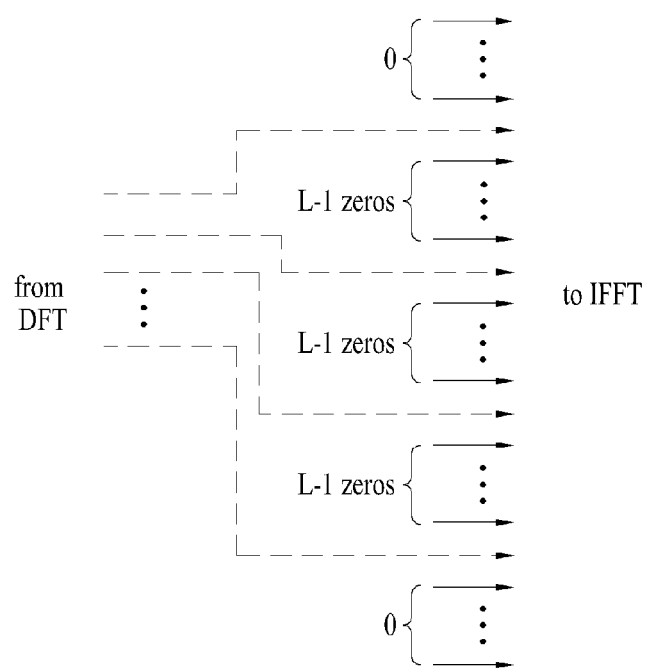
(b)

METHOD AND APPARATUS FOR PERFORMING DEMAPPING IN WIRELESS COMMUNICATION SYSTEM

This application claims the benefit of U.S. Patent Provisional Application No. 61/448,663 filed on Mar. 3, 2011 and U.S. Patent Provisional Application No. 61/449,040 filed on Mar. 3, 2011 and Korean Patent Application No. 10-2012-0016937, filed on Feb. 20, 2012, which are hereby incorporated by reference as if fully set forth herein.

BACKGROUND OF THE INVENTION

1. Field of the Invention

The present invention relates to a wireless communication system, and more particularly to a method and apparatus for performing demapping in a wireless communication system utilizing a modulo operation.

2. Discussion of the Related Art

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

SUMMARY OF THE INVENTION

Accordingly, the present invention is directed to a method and apparatus for performing demapping in a wireless communication system that substantially obviate one or more problems due to limitations and disadvantages of the related art. An object of the present invention is to provide a method and apparatus for effectively performing demapping in a wireless communication system utilizing a modulo operation. It will be appreciated by persons skilled in the art that the objects that can be achieved by the present invention are not limited to what have been particularly described hereinabove and the above and other objects that the present invention can achieve will be more clearly understood from the following detailed description taken in conjunction with the accompanying drawings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a demapping method of a receiver in a wireless communication system includes receiving an input signal and first information indicating whether a first modulo operation is performed on the input signal from a transmitter; if the first information indicates execution of the first modulo operation, performing a second modulo operation of the input signal, and acquiring a reception signal; generating a maximum function value having a highest probability that the reception signal corresponds to a candidate constellation point of an extended constellation; and generating a log-likelihood ratio (LLR) using the generated maximum function value.

If power of interference contained in the input signal is less than loss power caused by execution of the first modulo operation, the transmitter may not perform the first modulo operation.

The demapping method may further include receiving not only information regarding a total number of used streams but also order information of a first stream from the transmitter.

If the order of the first stream is a first or last order, the first modulo operation may not be performed.

The extended constellation may include a basic constellation point of a basic constellation and at least one extended constellation point.

The extended constellation point may be a constellation point arranged by repetition of the basic constellation point.

The extended constellation point may be located close to a modulo box through repetition of the modulo box including the basic constellation point, and may be selected from among constellation points located close to basic constellation points of the basic constellation.

The candidate constellation point may indicate a constellation point indicating the same bitstream on the extended constellation.

The maximum function value may be denoted by the following equation:

$$P_{max}[y \mid x = \alpha] = \max_{(\alpha)_i} \left\{ \frac{1}{\sqrt{2\pi}\,\sigma} \exp\left(-\frac{1}{2}\frac{|y - h(\alpha)_i|^2}{\sigma^2}\right) \right\} \quad \text{[Equation]}$$

wherein $\sigma^2$ is noise variance, y is a reception signal, h is a channel response, and $(\alpha)_i$ is a coordinate of the extended constellation of the extended constellation point of the candidate constellation point.

The LLR may be denoted by the following equation:

$$LLR(b_{R,k}) = \log \frac{\sum_{\alpha \in S_{R,k}^1} P_{max}[y \mid x = \alpha]}{\sum_{\alpha \in S_{R,k}^0} P_{max}[y \mid x = \alpha]} \quad \text{[Equation]}$$

wherein $\alpha$ is one of coordinates of a constellation symbol of a constellation, $\alpha \in S_{R,k}^0$ is a symbol where a $k^{th}$ bit mapped to a real number of the coordinate $\alpha$ is set to zero (0), and $\alpha \in S_{R,k}^0$ is a symbol where a $k^{th}$ bit mapped to a real number of the coordinate a is set to a value of 1.

The demapping method may further include generating an effective signal to interference-plus-noise ratio (SINR) by the receiver; and transmitting the effective SINR to the transmitter, wherein the effective SINR is represented by the following equation:

$$SINR_{\mathit{eff}} = \Phi^{-1}\left\{\frac{1}{N}\sum_{n=1}^{N}\Phi(SINR_n)\right\} \quad \text{[Equation]}$$

wherein $SINR_n$ is an $n^{th}$ SINR, N is a total number of SINRs, $\Phi(\ )$ is a function decided by mutual information of a symbol channel, and $\Phi^{-1}(\ )$ is an inverse function of the function $\Phi(\ )$.

The mutual information may be denoted by the following equation:

$$I(b, LLR) = \frac{1}{m}\sum_{i=1}^{m} I(b_i, LLR(b_i)) \quad \text{[Equation]}$$

wherein $b_i$ is an $i^{th}$ coded bit, m is a total number of coded bits, and $LLR(b_i)$ is LLR of the $i^{th}$ coded bit $b_i$.

In another aspect of the present invention, a receiver for performing demapping in a wireless communication system includes a reception module for receiving an input signal and first information indicating whether a first modulo operation is performed on the input signal from a transmitter; and a processor, if the first information indicates execution of the first modulo operation, for performing a second modulo operation of the input signal so as to acquire a reception signal, wherein the processor generates a maximum function value having a highest probability that the reception signal corresponds to a candidate constellation point of an extended constellation, and generates a log-likelihood ratio (LLR) using the generated maximum function value.

If power of interference contained in the input signal is less than loss power caused by execution of the first modulo operation, the transmitter does not perform the first modulo operation.

The reception module may receive not only information regarding a total number of used streams but also order information of a first stream from the transmitter. The processor, if the order of the first stream is a first or last order, may decide not to perform the first modulo operation.

The extended constellation may include a basic constellation point of a basic constellation and at least one extended constellation point.

The processor may decide the maximum function value using the following equation:

$$P_{max}[y \mid x = \alpha] = \max_{(\alpha)_i}\left\{\frac{1}{\sqrt{2\pi}\,\sigma}\exp\left(-\frac{1}{2}\frac{|y - h(\alpha)_i|^2}{\sigma^2}\right)\right\} \quad \text{[Equation]}$$

wherein $\sigma^2$ is noise variance, y is a reception signal, h is a channel response, and $(\alpha)_i$ is a coordinate of the extended constellation of the extended constellation point of the candidate constellation point.

The processor may decide the LLR using the following equation:

$$LLR(b_{R,k}) = \log \frac{\sum_{\alpha \in S_{R,k}^1} P_{max}[y \mid x = \alpha]}{\sum_{\alpha \in S_{R,k}^0} P_{max}[y \mid x = \alpha]} \quad \text{[Equation]}$$

wherein $\alpha$ is one of coordinates of a constellation symbol of a constellation, $\alpha \in S_{R,k}^0$ is a symbol where a $k^{th}$ bit mapped to a real number of the coordinate $\alpha$ is set to zero (0), and $\alpha \in S_{R,k}^0$ is a symbol where a $k^{th}$ bit mapped to a real number of the coordinate a is set to a value of 1.

The receiver may further include a transmission module for generating an effective signal to interference-plus-noise ratio (SINR) to the transmitter, wherein the processor generates the effective SINR using the following equation:

$$SINR_{eff} = \Phi^{-1}\left\{\frac{1}{N}\sum_{n=1}^{N}\Phi(SINR_n)\right\} \quad \text{[Equation]}$$

wherein $SINR_n$ is an $n^{th}$ SINR, N is a total number of SINRs, $\Phi(\ )$ is a function decided by mutual information of a symbol channel, and $\Phi^{-1}(\ )$ is an inverse function of the function $\Phi(\ )$.

The processor may decide the mutual information using the following equation:

$$I(b, LLR) = \frac{1}{m}\sum_{i=1}^{m} I(b_i, LLR(b_i)) \quad \text{[Equation]}$$

wherein $b_i$ is an $i^{th}$ coded bit, m is a total number of coded bits, and $LLR(b_i)$ is LLR of the $i^{th}$ coded bit $b_i$.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a conceptual diagram illustrating various examples for satisfying single carrier characteristics and mapping an input symbol to a subcarrier in a frequency domain;

DESCRIPTION OF SPECIFIC EMBODIMENTS

Figure 1:
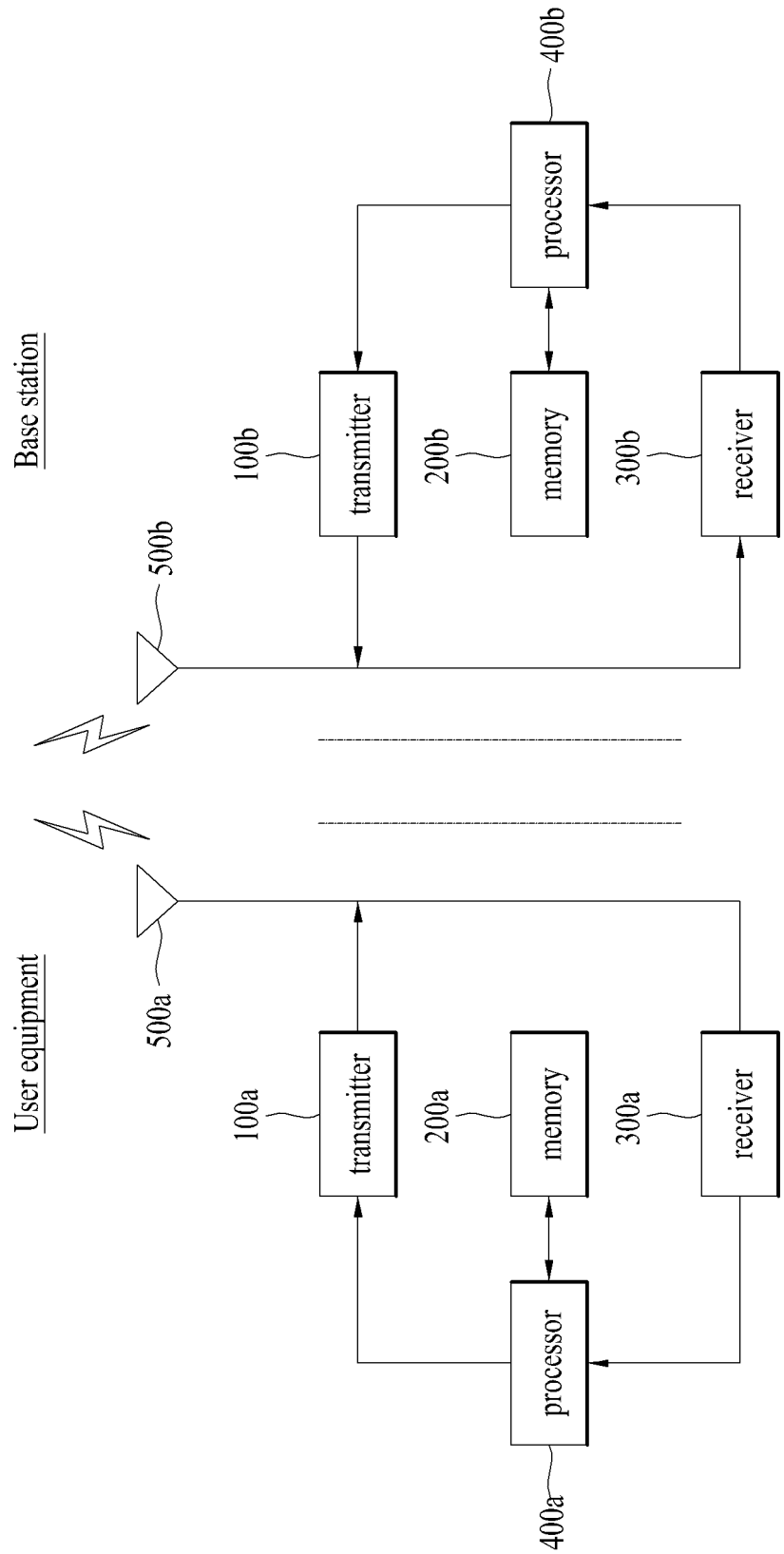
FIG. 1 is a block diagram illustrating a Base Station (BS) and a user equipment (UE) applicable to embodiments of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), a Multi-Carrier frequency Division Multiple Access (MC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station (BS). The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device.

Also, in the present invention, a Base Station (BS) means a fixed station that performs communication with a user equipment and/or another base station, and exchanges various kinds of data and control information with the user equipment and another base station. The base station may be referred to another terminology such as an evolved-NodeB (eNB), a Base Transceiver System (BTS), and an Access Point (AP).

In the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

In the present invention, a rank or a transmission rank may indicate the number of layers multiplexed/allocated to one OFDM symbol or one data resource element (RE).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of REs carrying Downlink Control Information (DCI), a set of REs carrying Control Format Indicator (CFI), a set of REs carrying downlink ACK/NACK (ACKnowlegement/Negative ACK), and a set of REs carrying DL data, respectively.

In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively.

In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

On the other hand, in the present invention, ACK/NACK information mapping to a specific constellation point may be conceptually identical to ACK/NACK information mapping to a specific complex modulation symbol. In addition, ACK/NACK information mapped to the specific complex modulation symbol may be conceptually identical to ACK/NACK information modulated by a specific complex modulation symbol.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b.

The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination.

In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention.

In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. Each of the memories 200a and 200b may be used as a buffer. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
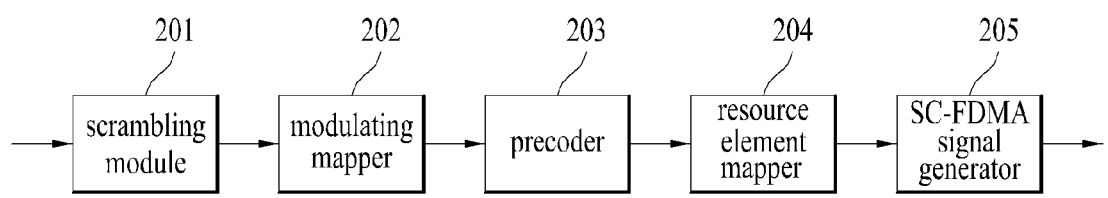
FIG. 2 is a conceptual diagram illustrating the signal processing for enabling a user equipment (UE) to transmit an uplink (UL) signal.

FIG. 2 is a block diagram of an exemplary transmitter in each of the UE and the BS. Operations of the transmitters 100a and 100b will be described below in more detail with reference to FIG. 2. Referring to FIG. 2, each of the transmitters 100a and 100b of the UE include a scrambler 201, a modulation mapper 202, a precoder 203, a resource element (RE) mapper 204, and an SC-FDMA signal generator 205.

Referring to FIG. 2, the scrambler 201 may scramble a transmission signal in order to transmit the uplink signal. The scrambled signal is input to the modulation mapper 202, such that the modulation mapper 202 modulates the scrambled signal to complex symbols in Binary Phase Shift Keying (BPSK), Quadrature Phase Shift Keying (QPSK), or 16-ary Quadrature Amplitude Modulation (16QAM) according to the type of the transmission signal and/or a channel status. A transform precoder 203 processes the complex symbols and a resource element mapper 204 may map the processed complex symbols to time-frequency resource elements, for actual transmission. The mapped signal may be transmitted to the BS through an antenna after being processed in a Single Carrier-Frequency Division Multiple Access (SC-FDMA) signal generator 205.

Figure 3:
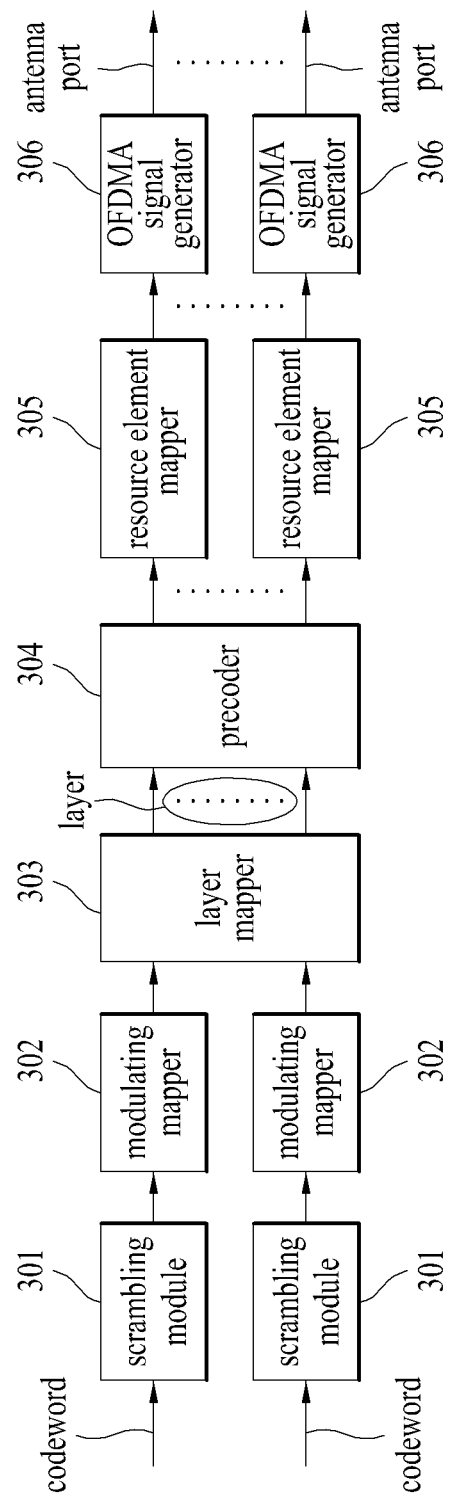
FIG. 3 is a conceptual diagram illustrating the signal processing for enabling a base station (BS) to transmit a downlink (DL) signal.

FIG. 3 is a conceptual diagram illustrating the signal processing for enabling a BS to transmit a downlink (DL) signal.

Referring to FIG. 3, the transmitter 100b of the BS may include a scrambler 301, a modulation mapper 302, a layer mapper 303, a precoder 304, a resource element (RE) mapper 305, and an OFDMA signal generator.

The BS can transmit a signal or at least one codeword via a downlink. Therefore, the signal or codewords may be processed as complex symbols by the scrambler 301 and the modulation mapper 302 in the same manner as in the uplink operation shown in FIG. 2. Thereafter, the complex symbols are mapped to a plurality of layers by the layer mapper 303, and each layer is multiplied by a predetermined precoding matrix and is then allocated to each transmission antenna by the precoder 304. The processed transmission signals of individual antennas are mapped to time-frequency resource elements (REs) to be used for data transmission by the RE mapper 305. Thereafter, the mapped result may be transmitted via each antenna after passing through the OFDMA signal generator 306.

In the case where a UE for use in a mobile communication system transmits an uplink signal, a Peak to Average Power Ratio (PAPR) may become more serious than in the case where the BS transmits a downlink signal. Thus, as described in FIGS. 2 and 3, the SC-FDMA scheme is used for uplink signal transmission in a different way from the OFDMA scheme used for downlink signal transmission.

Figure 4:
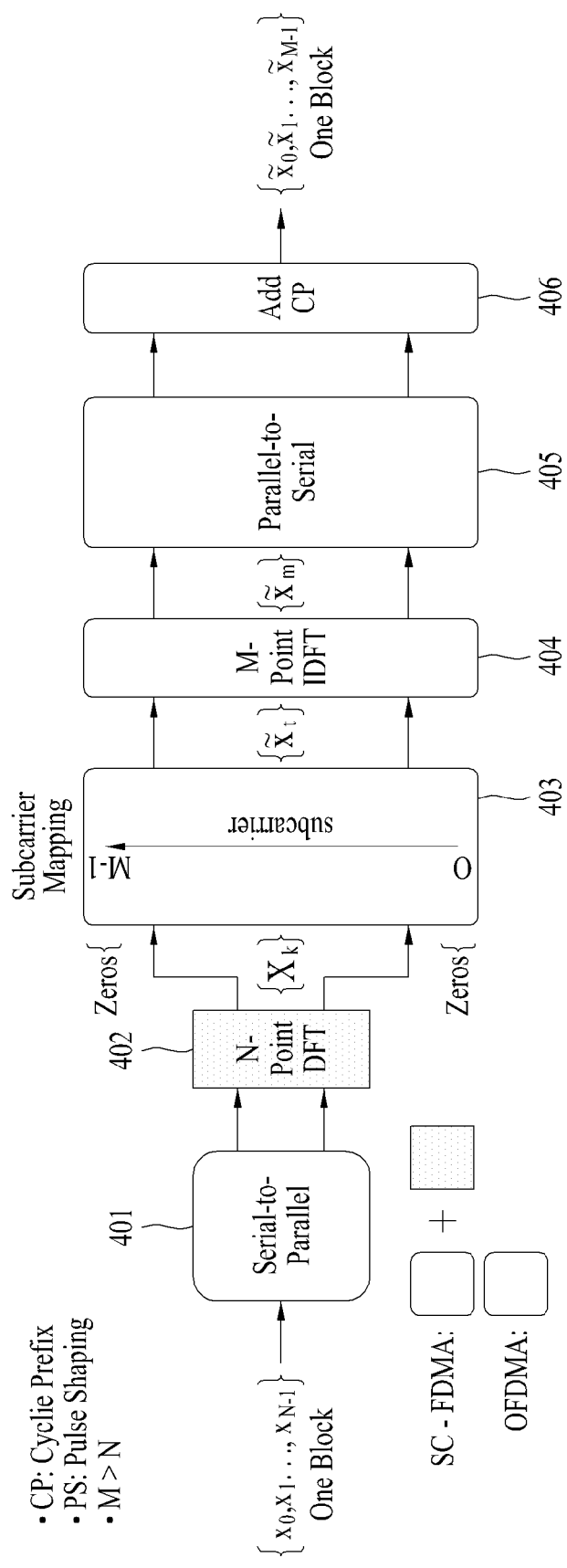
FIG. 4 is a conceptual diagram illustrating an SC-FDMA scheme and an OFDMA scheme applicable to embodiments of the present invention.

FIG. 4 is a conceptual diagram illustrating an SC-FDMA scheme and an OFDMA scheme applicable to embodiments of the present invention. In the 3GPP system, the OFDMA scheme is used in downlink and the SC-FDMA scheme is used in uplink.

Referring to FIG. 4, not only a UE for uplink signal transmission but also a BS for downlink signal transmission includes a Serial-to-Parallel converter 401, a subcarrier mapper 403, an M-point IDFT module 404, a Cyclic Prefix (CP) addition module 406. However, a UE for transmitting a signal using the SC-FDMA scheme further includes an N-point DFT module 402, and compensates for a predetermined part of the IDFT processing influence of the M-point IDFT module 1504 so that a transmission signal can have single carrier characteristics (i.e., single-carrier properties).

The SC-FDMA must satisfy single carrier characteristics. FIG. 5 shows examples for satisfying single carrier characteristics and mapping an input symbol to a subcarrier in a frequency domain. In FIG. 5(a) or 5(b), if a DFT-processed symbol is assigned to a subcarrier, a transmission signal satisfying single carrier characteristics can be obtained. FIG. 5(a) shows a localized mapping method, and FIG. 5(b) shows a distributed mapping method.

Figure 6:
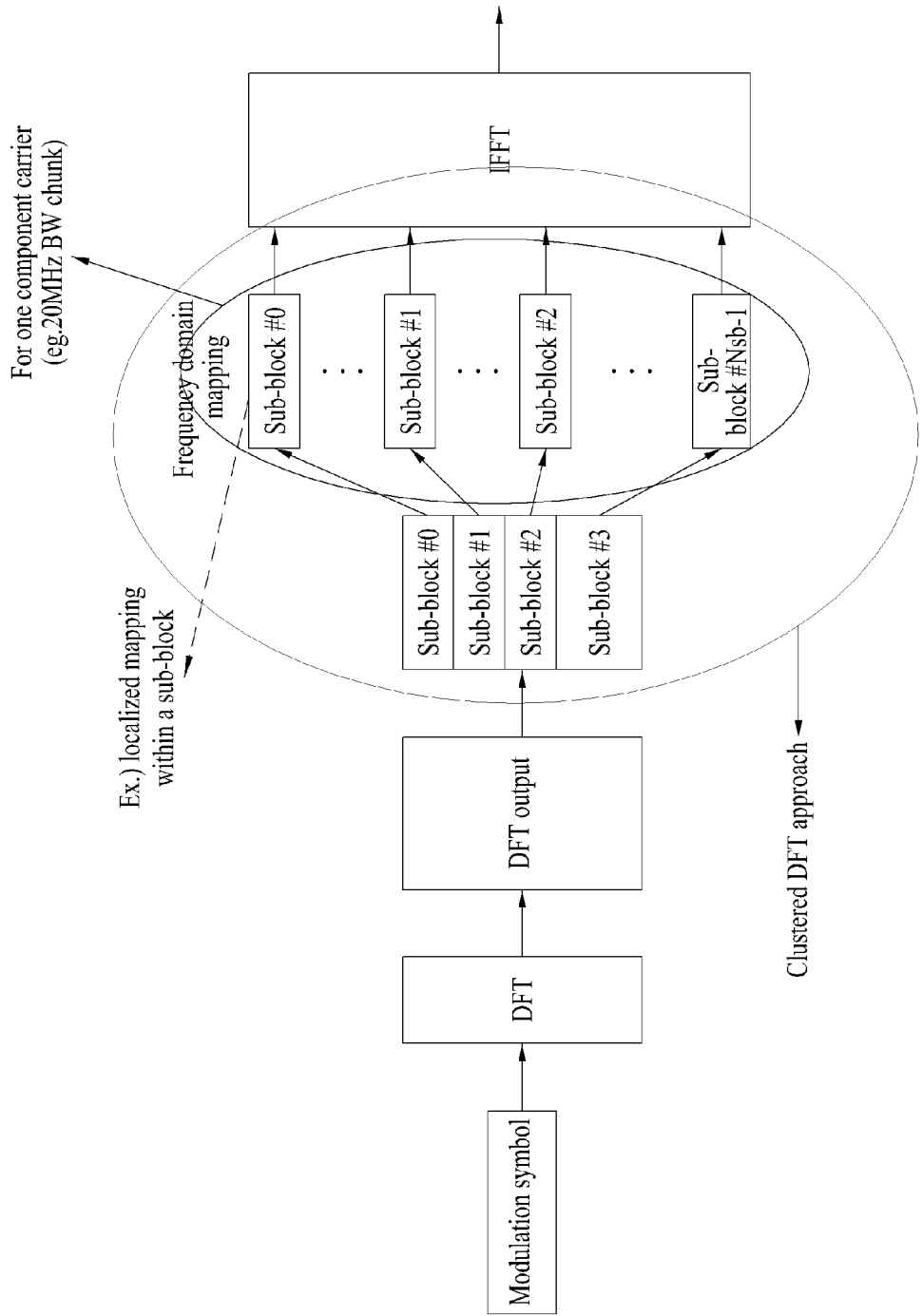
FIG. 6 is a conceptual diagram illustrating the signal processing for mapping DFT process output samples to a single carrier in a clustered SC-FDMA.
Figure 7:
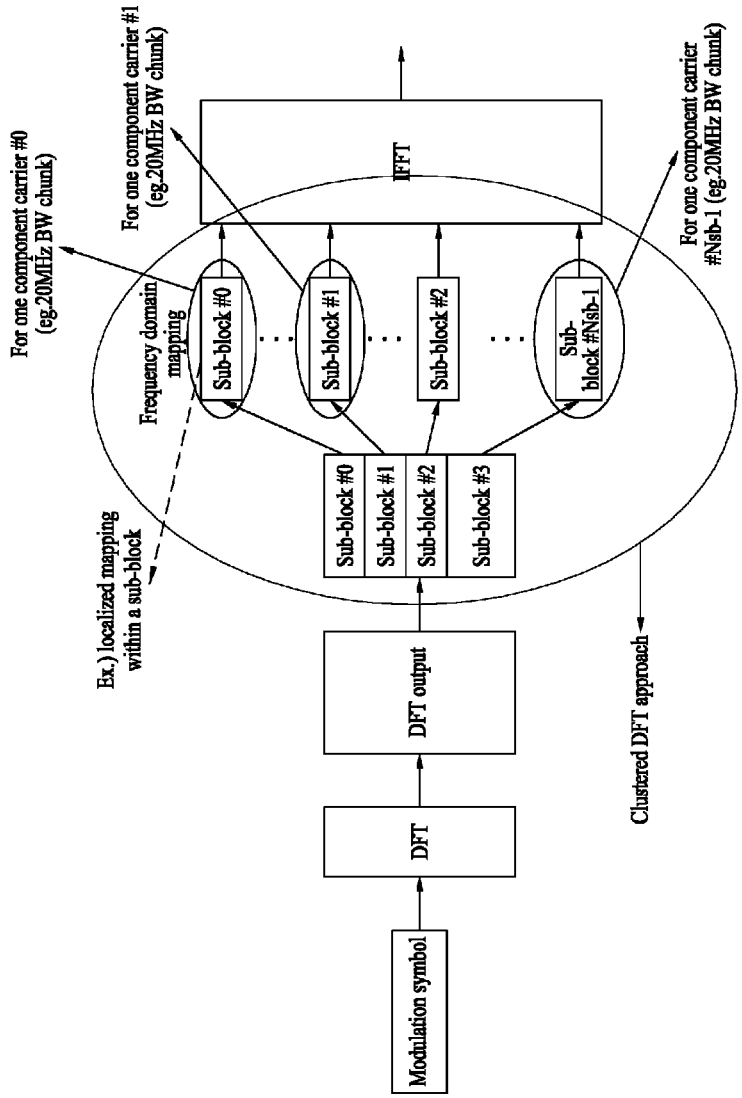
FIGS. 7 and 8 show the signal processing in which DFT process output samples are mapped to multicarriers in a clustered SC-FDMA.
Figure 8:
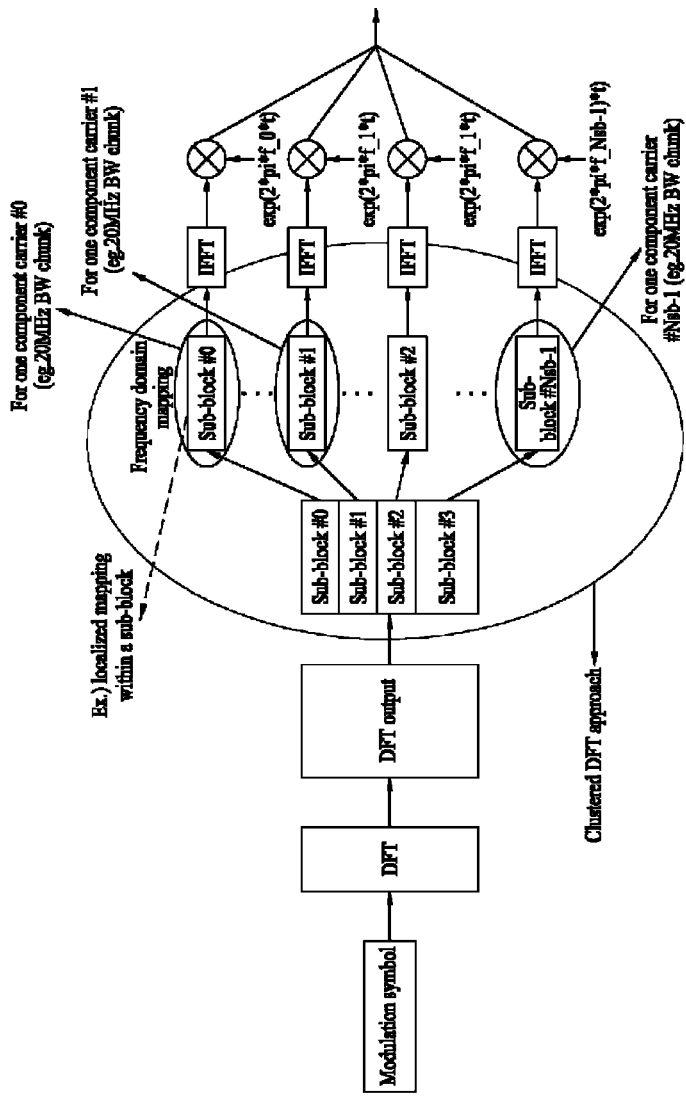

On the other hand, the clustered DFT-s-OFDM scheme may be adapted to the transmitter 100a or 100b. The clustered DFT-s-OFDM is considered to be a modification of the conventional SC-FDMA scheme. In more detail, a signal output from the precoder is divided into some sub-blocks, and the divided sub-blocks are discontinuously mapped to subcarriers. FIGS. 6 to 8 show examples for mapping an input symbol to a single carrier by a clustered DFT-s-OFDM.

FIG. 6 shows the signal processing in which DFT-process output samples are mapped to one carrier in the clustered SC-FDMA. FIGS. 7 and 8 show the signal processing in which DFT process output samples are mapped to multicarriers in a clustered SC-FDMA. FIG. 6 shows the example of intra-carrier cluster SC-FDMA application. FIGS. 7 and 8 show examples of the inter-carrier cluster SC-FDMA application. FIG. 7 shows the example in which a signal is generated through a single IFFT block under the condition that component carriers are contiguously allocated to a frequency domain and the subcarrier spacing between contiguous component carriers is arranged. FIG. 8 shows another example in which a signal is generated through several IFFT blocks under the condition that component carriers are non-contiguously allocated to a frequency domain.

Figure 9:
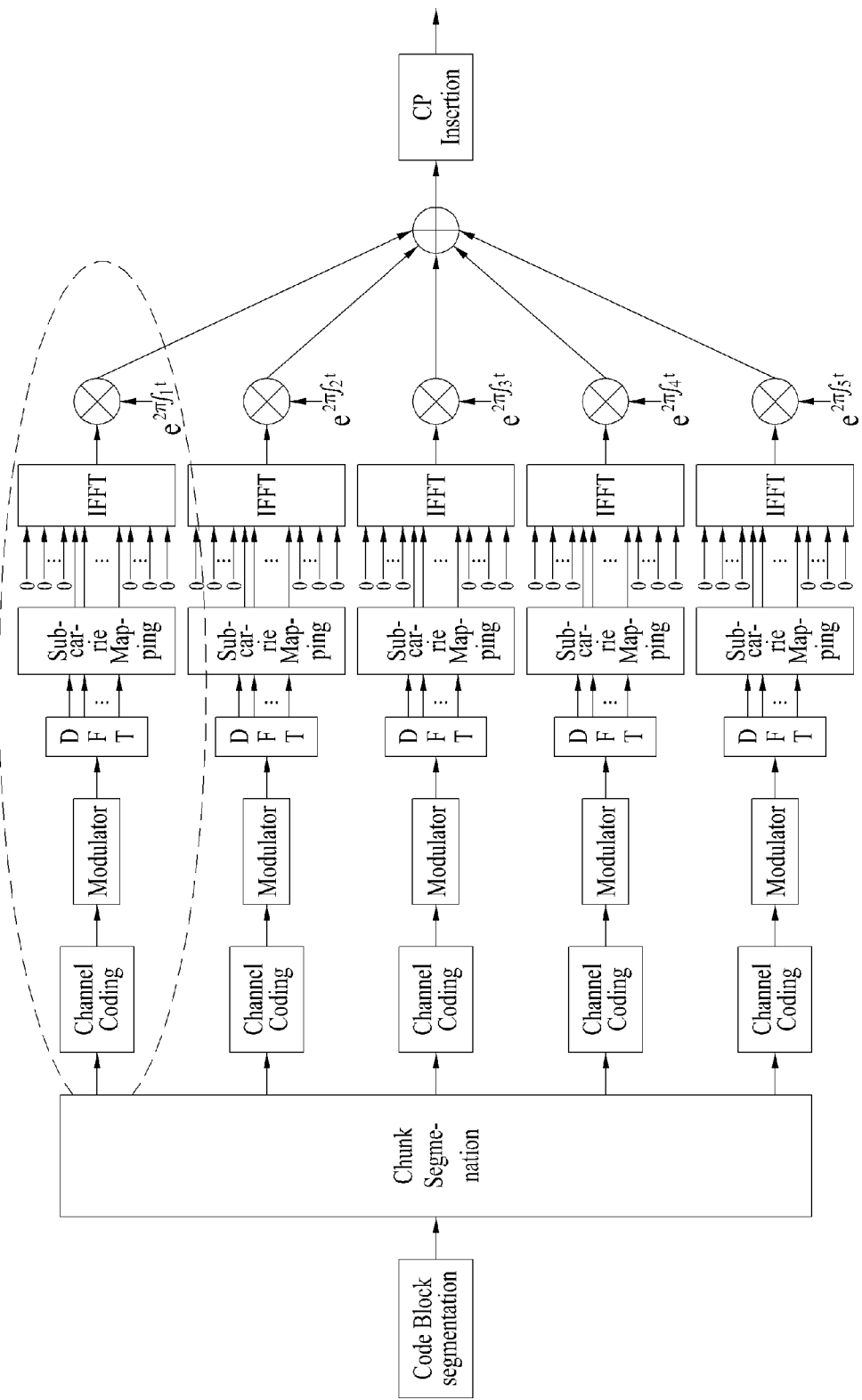
FIG. 9 shows exemplary segmented SC-FDMA signal processing.

FIG. 9 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by N×SC-FDMA or N×DFT-s-OFDMA. For convenience of description and better understanding of the present invention, the segmented SC-FDMA, N×SC-FDMA and N×DFT-s-OFDMA may be generically as 'segment SC-FDMA'. Referring to FIG. 9, in order to reduce the single carrier characteristic condition, the segment SC-FDMA groups all the time domain modulation symbols into N groups, such that a DFT process is performed in units of a group.

Figure 10:
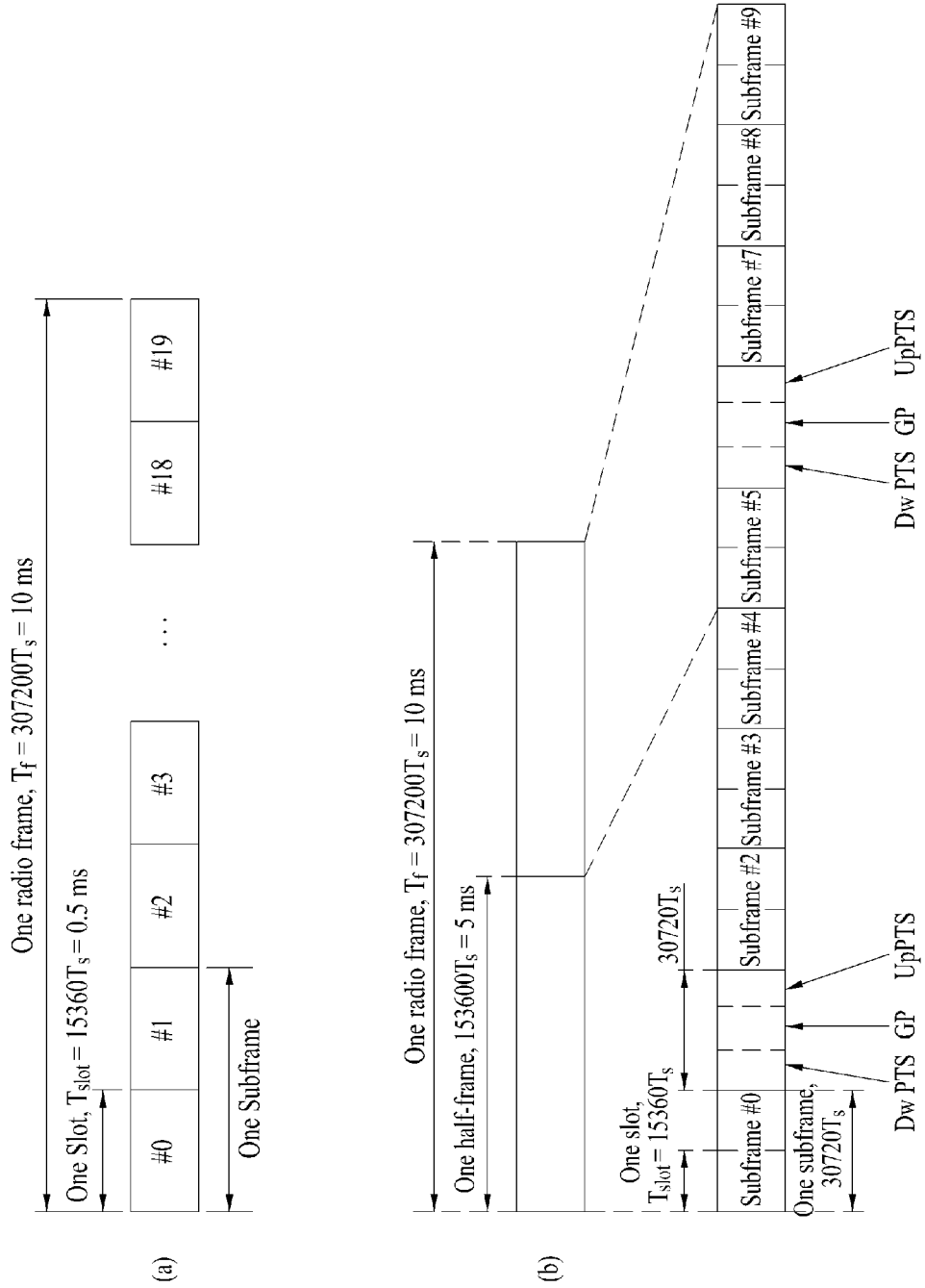
FIG. 10 shows exemplary radio frames for use in a wireless communication system.

FIG. 10 illustrates an exemplary structure of a radio frame in a wireless communication system. Particularly, FIG. 10(a) illustrates a radio frame according to a Frame Structure type 1 (FS-1) of a 3GPP LTE/LTE-A system, and FIG. 10(b) illustrates a radio frame according to a Frame Structure type 2 (FS-2) of the 3GPP LTE/LTE-A system. The frame structure of FIG. 10(a) may be applied to a Frequency Division Duplexing (FDD) mode and a half-FDD (H-FDD) mode. The frame structure of FIG. 10(b) may be applied to a Time Division Duplexing (TDD) mode.

Referring to FIG. 10, a 3GPP LTE/LTE-A radio frame is 10 ms (307,200$T_s$) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. $T_s$ represents a sampling time and is given as $T_s$=1/(2048×15 kHz). Each subframe is further divided into two slots, each of 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may be differently constructed according to a duplex mode. For example, in the FDD mode, DL transmission and UL transmission are discriminated according to a frequency, such that the radio frame includes only one of a DL subframe and a UL subframe in a time domain.

On the other hand, in the TDD mode, DL transmission and UL transmission are discriminated according to time, such that subframes contained in a frame may be classified into DL subframes and UL subframes. Table 1 shows an exemplary UL-DL construction in a TDD mode.

Figure 11:
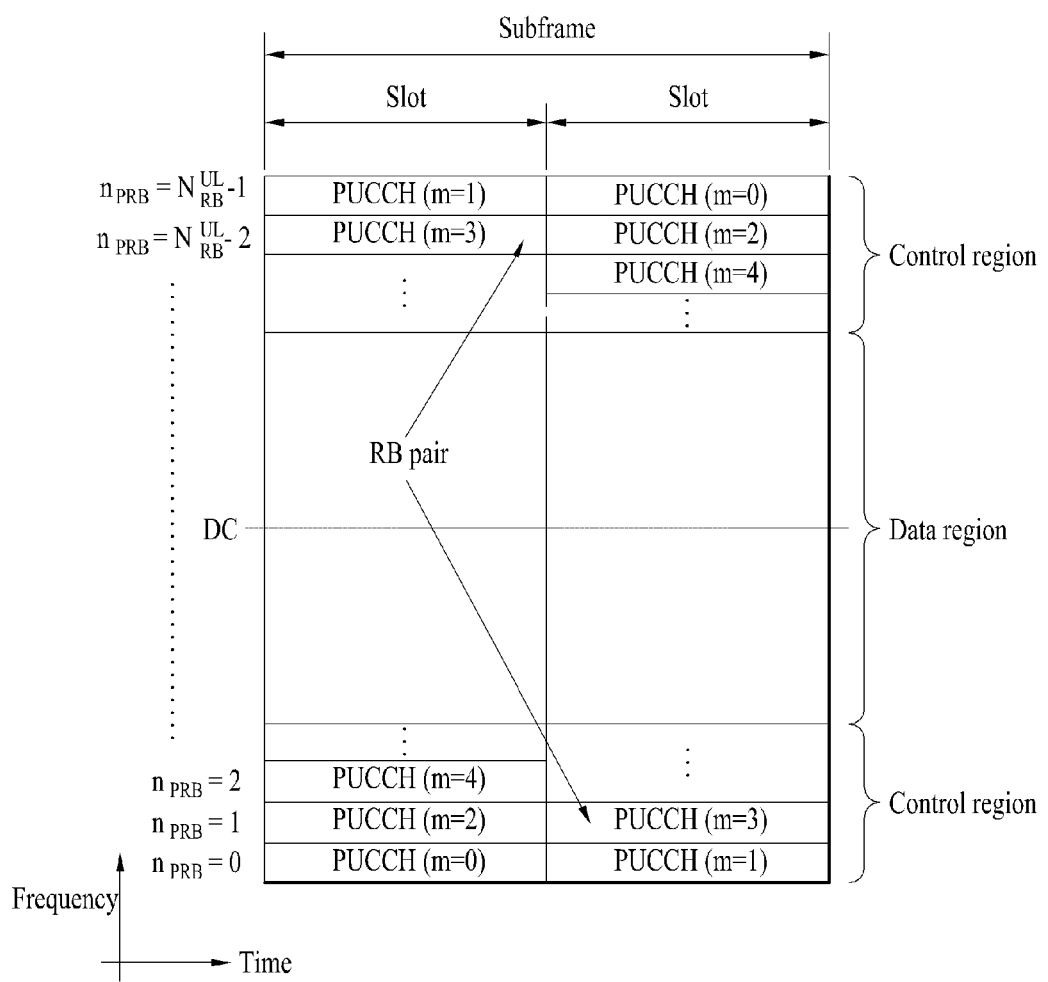
FIG. 11 shows an uplink subframe structure.

FIG. 11 shows an uplink subframe structure according to the present invention. Referring to FIG. 11, the uplink subframe may be divided into a control region and a data region in a frequency domain. At least one Physical Uplink Control Channel (PUCCH) carring uplink control information (UCI) may be assigned to the control region. A Physical Uplink Shared Channel (PUSCH) carrying user data may be assigned to the data region. However, in the case where the UE selects the SC-FDMA scheme in LTE Release 8 or 9, one UE does not simultaneously transmit PUCCH and PUSCH so as to maintain single carrier characteristics.

Uplink control information (UCI) transmitted over PUCCH has different sizes and usages according to a PUCCH format. In addition, UCI may have different sizes according to a coding rate. For example, the following PUCCH format may be defined.

(1) PUCCH Format 1: Used for On-Off keying (OOK) modulation and Scheduling Request (SR)

(2) PUCCH Format 1a and 1b: Used for transmission of Acknowledgment/Negative Acknowledgment (ACK/NACK) information 1) PUCCH Format 1a: BPSK-modulated ACK/NACK information of 1 bit 2) PUCCH Format 1b: QPSK-modulated ACK/NACK information of 2 bits 3) PUCCH Format 2: Used for QPSK modulation and CQI transmission 4) PUCCH Format 2a and 2b: Used for simultaneous transmission of CQI and ACK/NACK information Table 1 shows modulation schemes and the numbers of bits per subframe according to different PUCCH formats, Table 2 shows the numbers of reference symbols (RSs) per slot for the PUCCH formats, and Table 3 shows the locations of SC-FDMA symbols of RSs according to the PUCCH formats. In Table 1, PUCCH Format 2a and 2b may correspond to a normal CP.

TABLE 1

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Extended CP |
| --- | --- | --- |
| 1, 1a, 1b | 3 | 2 |
| 2 | 2 | 1 |
| 2a, 2b | 2 | N/A |

TABLE 3

| PUCCH format | SC-FDMA symbol locations of RS | |
| --- | --- | --- |
| | Normal CP | Extended CP |
| 1, 1a, 1b | 2, 3, 4 | 2, 3 |
| 2, 2a, 2b | 1, 5 | 3 |

In a UL subframe, subcarriers distant from a DC (Direct Current) subcarrier may be used as a control region. In other words, subcarriers located at both ends of a UL transmission bandwidth are assigned to UL control information transmission. DC subcarriers are reserved without being used in signal transmission, and are mapped to a carrier frequency ($f_0$ in a frequency upconversion process caused by the OFDM/SC-FDMA signal generator.

A PUCCH for a UE is allocated to an RB pair in a subframe. The RBs of the RB pair occupy different subcarriers in two slots. This is called frequency hopping of an RB pair allocated to a PUCCH over a slot boundary. However, if the frequency hopping is not used, an RB pair occupies the same subcarriers. Irrespective of the frequency hopping, a PUCCH for one UE is assigned to an RB pair contained in one subframe, such that the same PUCCH is transmitted once through one RB in each slot contained in one UL subframe in such a manner that the same PUCCH is transmitted two times in each slot of one UL subframe.

Hereinafter, an RB pair used for each PUCCH transmission of one subframe is called a PUCCH region. In addition, the PUCCH region and codes used in the PUCCH region are called a PUCCH resource. In other words, different PUCCH resources may have different PUCCH regions or may have different codes within the same PUCCH region. For convenience of description, a PUCCH carrying ACK/NACK information is called 'ACK/NACK PUCCH', a PUCCH carrying CQI/PMI/RI information is called a Channel State Information (CSI) PUCCH, and a PUCCH carrying the SR is called an SR PUCCH.

The UE receives PUCCH resources for UCI transmission from the BS according to the explicit or implicit scheme.

Uplink Control Information (UCI) such as ACK/NACK (ACKnowlegement/negative ACK), Channel Quality Indicator (CQI), Precoding Matrix Indicator (PMI), Rank Information (RI), Scheduling Request (SR), etc. may be transmitted over a control region of the UL subframe.

In a wireless communication system, the BS and the UE mutually transmit/receive signals or data. If the BS transmits data to the UE, the UE decodes the received data. If the data is successfully decoded, ACK is transmitted to the BS. If the data decoding fails, NACK is transmitted to the BS. The above-mentioned concept is also applied to the other case for data transmission from the UE to the BS without any change. In the 3GPP LTE system, the UE receives data (e.g., PDSCH) from the BS, and transmits PDSCH ACK/NACK to the BS through implicit PUCCH resources decided by PDCCH resources carrying PDSCH scheduling information. If the UE does not receive data, this may be considered to be a discontinuous transmission (DTX) state, may indicate the absence of data received by a predetermined rule, or may also be carried out in the same manner as in NACK (indicating unsuccessful decoding of reception data).

Meanwhile, the transmission 100a or 100b may include an encoder, a mapper, and a DPC unit.

In this case, the encoder encodes each input information bit using a channel code. In addition, the channel code may include an error correction function caused by a channel. A variety of encoding schemes can be used for the encoder, for example, a block-type encoding, a Trellis-type encoding, etc. The Trellis-type encoding may include turbo coding or convolution coding.

In addition, the mapper maps the coded data into a data symbol (w) representing locations on a signal constellation. The data symbol (w) is obtained when data to be transmitted to each UE is encoded and constellation-mapped. If there is no restriction as to a modulation scheme and m-Phase Shift Keying (m-PSK) or m-Quadrature Amplitude Modulation (m-QAM) may be used as the modulation scheme. For example, the m-PSK may be BPSK, QPSK, or 8-PSK. The m-QAM may be 16-QAM, 64-QAM, or 256-QAM.

In addition, the DPC unit performs DPC processing on the data symbol (w) received from the mapper such that it generates a transmission signal (M). The DPC unit may include an interference subtraction unit and a modulo operator. The interference subtraction unit subtracts interference (S) known to the transmitters 100a and 100b from the mapped data symbol (w). Provided that a data symbol sent to the UE is referred to as 'w' and interference known to the transmitter 100*a* or 100*b* is referred to as 'S', the interference subtraction unit performs calculation denoted by (w−S) in such a manner that the interference S is deducted.

In order to operate DPC in all kinds of interference (S), it is necessary to change the shape of an aggregate of transmission (Tx) signals. In more detail, provided that interference (S) is high, the resultant signal caused by the high interference (S) may be higher than a transmit power constraint as necessary. Considering the above-mentioned problem, a modulo operation for changing the shape of an aggregate of Tx signals to another shape is performed.

The modulo operator performs the modulo operation on the output (w−S) of the interference subtraction unit so as to output a transmission signal M. For example, if a QPSK symbol is denoted by (±1±j) in QPSK constellation, (−1+j) makes −5−3j, −5+j, +3+j, +3+5j, etc. to operate as the same symbol through the modulo operation, thereby making provision for all kinds of interference (S). The transmission signal M output from the modulo operator is represented by the following equation 1.

$$M=(w-S)_{mod}=(w-S)+a \cdot L+jb \cdot L \quad \text{[Equation 1]}$$

In Equation 1, a or b is an integer, and L is the size of a half of the modulo box.

The transmitter 100*a* pre-subtracts an interference signal from an objective signal, and transmits the resultant signal. In this case, Tx power may increase due to interference, such that the Tx power may be limited by the modulo operation.

The receiver 300*a* or 300*b* may include a modulo operator, a demapper, and a decoder. The modulo operator performs the modulo operation on the input signal R so as to output a reception signal Y. The input signal R is denoted by R=M+ S+N because a transmission signal M passes through a channel so that noise N is added to interference S, resulting in R=M+S+N. Therefore, the input signal R is denoted by Equation 2.

$$R=M+S+N=w+N+a \cdot L+jb \cdot L \quad \text{[Equation 2]}$$

In addition, if the modulo operation is applied to the input signal R, the following equation 3 can be obtained.

$$Y=R_{mod}=w+N+c \cdot L+jb \cdot L \quad \text{[Equation 3]}$$

In Equation 3, c or d is an integer, and L is the size of a half of the modulo box. The modulo operator of the receiver moves the reception signal Y to a square modulo box having the width of 2L and the height of 2L.

The demapper performs demapping of the reception signal Y. The demapper estimates the reception signal Y as one point from among constellation coordinates, such that symbol level information can be converted into bit level information. The decoder decodes the symbol demapped by the demapper such that it recovers original information bits.

Figure 12:
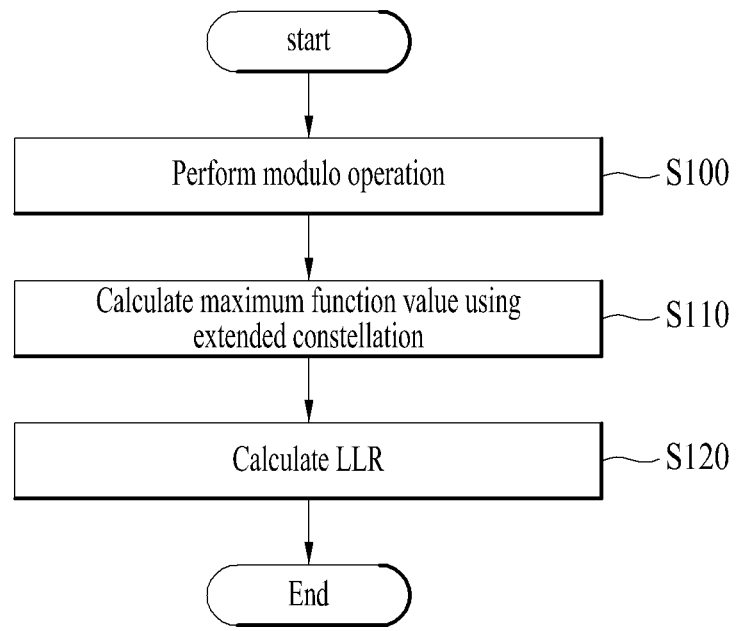
FIG. 12 is a flowchart illustrating a demapping method according to one embodiment of the present invention.

FIG. 12 shows the demapping method according to one embodiment of the present invention.

Referring to FIG. 12, the modulo operation is performed on the reception signal in step S100. The modulo operation is applied to the input signal R of the receiver, such that the reception signal Y is output.

A candidate function value for the modulo-operated reception signal Y is generated using a candidate constellation point of the extended constellation, and a maximum function value is selected from among the generated candidate function values in step S110. The candidate function value indicates likelihood (or possibility) that the reception signal Y may correspond to a candidate constellation point of the extended constellation. The extended constellation includes not only basic constellation points of the basic constellation but also extended constellation points. A maximum value from among the above-mentioned candidate function values is called a maximum function value, and the maximum function value is selected from among the candidate function values.

Figure 13:
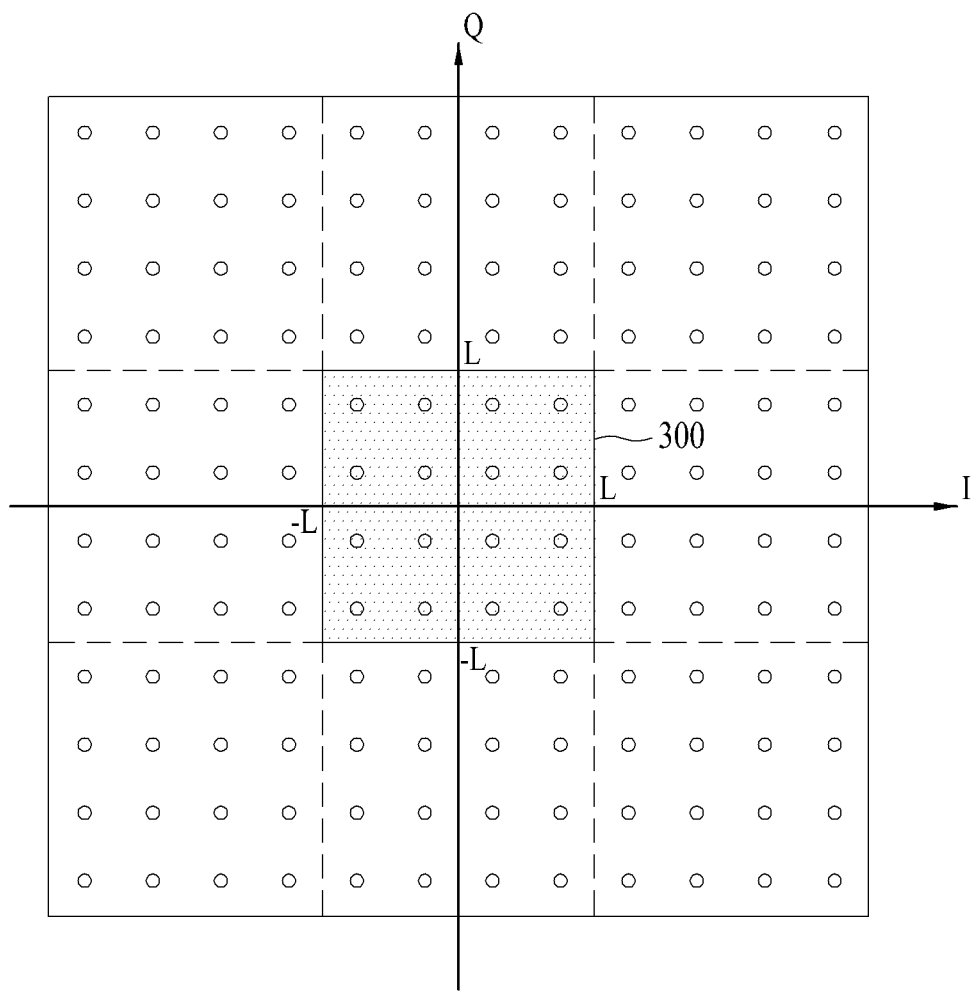
FIG. 13 shows a method for generating an extended constellation according to one embodiment of the present invention.

FIG. 13 shows a method for generating an extended constellation according to one embodiment of the present invention. Basic constellation for 16-QAM will hereinafter be described with reference to FIG. 13. Constellation composed of multiple constellation points corresponding to symbols of the modulo box 300 is referred to as a basic constellation, and a basic constellation for 16-QAM is composed of 16 constellation points contained in the modulo box 300.

The extended constellation includes basic constellation points of the basic constellation and extended constellation points. The extended constellation points may refer to the remaining constellation points other than the basic constellation points. The modulo box 300 is a border indicating a region in which basic constellation points are located.

In accordance with one example of generating the extended constellation points, due to repetition of the modulo box, the extended constellation points are arranged close to the modulo box 300 of the basic constellation. 8 modulo boxes may be densely arranged in the vicinity of one basic constellation, and arrangement of constellation points contained in the 8 modulo boxes may be identical to arrangement of the basic constellation. In this case, the modulo-box repetition means that constellation points contained in the modulo box are copied.

In this case, some of the constellation points contained in the eight modulo boxes may be selected such that the selected constellation points may be used as the extended constellation points. For example, four modulo-boxes are repeated arranged in up, down, left, and right directions, four constellation points close to the origin of constellation points are selected from among constellation points located in each modulo box, such that a total of 16 extended constellation points can be obtained.

In another example, constellation points close to constellation points located in the vicinity of a border from among basic constellation points may be selected as the extended constellation points. Therefore, the extended constellation points located close to the modulo box of the basic constellation can be selected.

In still another example, basic constellation points may be repeatedly arranged in a horizontal or vertical direction. Such repeated arrangement means that basic constellation points are copied in a vertical or horizontal direction while simultaneously being equally arranged with the same interval therebetween. Therefore, one or more extended constellation points may be selected from among the copied basic constellation points.

As described above, one or more extended constellation points may be generated, and the generated extended constellation points are arranged on the constellation along with the basic constellation points, such that the extended constellation can be acquired. When generating the extended constellation, various m-PSK or m-QAM basic constellations (for example, BPSK, QPSK, 8-QAM, 16-QAM, 64-QAM, 128-QAM, and 256-QAM) can be utilized. In case of the basic constellation, the constellation points located at the constellation corresponding to a bitstream may have different locations.

Figure 14:
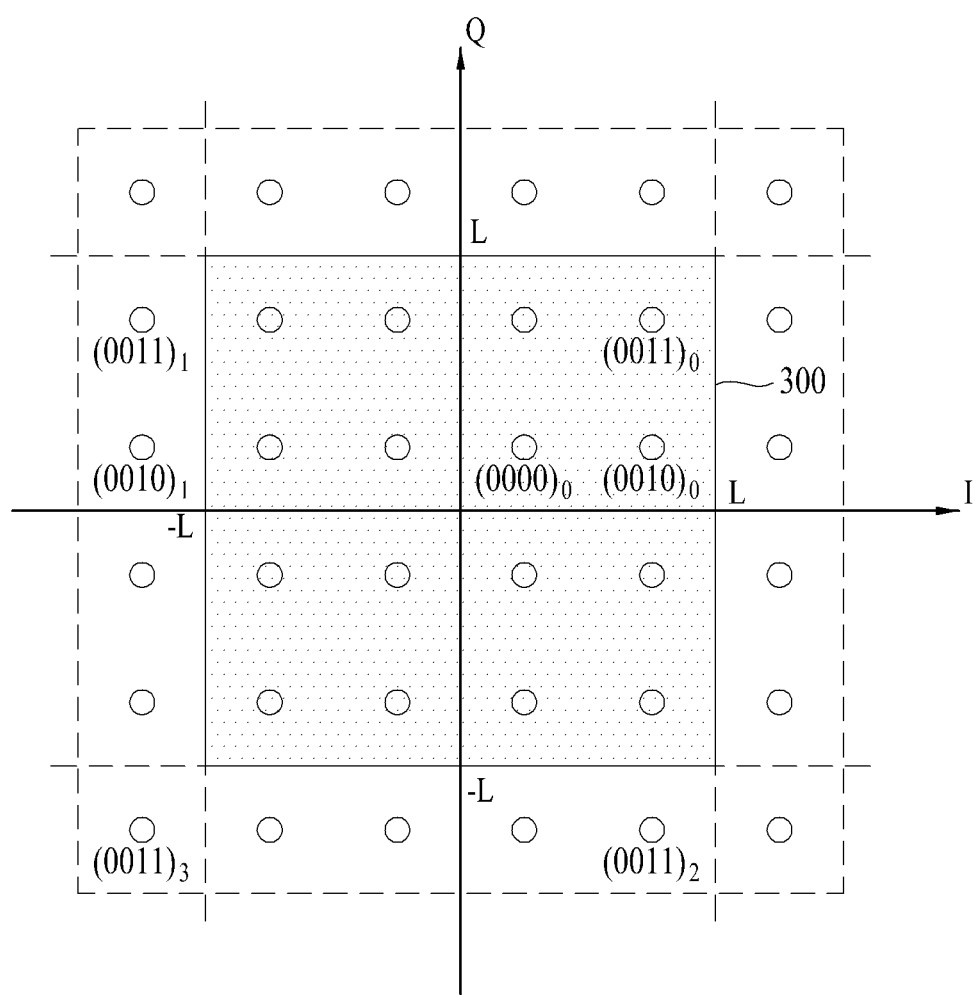
FIG. 14 shows exemplary arrangement of candidate constellation points of the extended constellation shown in FIG. 13.

FIG. 14 shows exemplary arrangement of candidate constellation points of the extended constellation shown in FIG. 13. Referring to FIG. 4, the extended constellation includes not only the basic constellation points of the basic constellation, but also multiple extended constellation points located close to the modulo box 300. 8 modulo boxes are located close to each other in the vicinity of one basic constellation, and arrangement of constellation points contained in the 8 modulo boxes are identical to arrangement of constellation points of the basic constellation.

One or more constellation points indicating the same bitstream may be referred to as candidate constellation points, and the candidate constellation points may include one or more constellation points on the extended constellation.

Each side constellation point being located at a lateral part but not an edge part from among basic constellation points may negate a single extended constellation point. For example, a basic constellation point indicating a bitstream $(0010)_0$ located at a right lateral part may generate/arrange an extended constellation point indicating a bitstream $(0010)_1$ located at a left lateral part, because arrangement of constellation points contained in the modulo box 300 is identical to arrangement of constellation points on the basic constellation although the modulo box 300 is repeatedly arranged. Therefore, the candidate constellation points indicating a bitstream (0010) are comprised of the basic constellation point indicating the bitstream $(0010)_0$ and the extended constellation point indicating the bitstream $(0010)_1$.

Corner constellation points located at an edge part from among the basic constellation points may generate three extended constellation points. For example, the basic constellation point indicating a bitstream $(0011)_0$ located at an upper right corner may generate an extended constellation point indicating a bitstream $(0011)_1$ located at an upper left part, an extended constellation point indicating a bitstream $(0011)_2$ located at a lower right part, and an extended constellation point indicating a bitstream $(0011)_3$ located at a lower left part. Therefore, the candidate constellation point indicating the bitstream (0011) may be comprised of not only a basic constellation point indicating a bitstream $(0011)_0$ but also three extended constellation points respectively indicating bitstreams $(0011)_1$, $(0011)_2$, and $(0011)_3$.

The remaining constellation points other than corner constellation points or side constellation points from among the basic constellation points are used as inner constellation points, such that there occur no extended constellation points. For example, the basic constellation point indicating the bitstream $(0000)_0$ located in the vicinity of the origin of the constellation does not generate the extended constellation point, because arrangement of constellation points contained in the modulo box 300 is identical to arrangement of constellation points on the basic constellation due to repeated arrangement of the modulo box. Therefore, the candidate constellation point indicating the bitstream (0000) is one of the basic constellation points indicating the bitstream $(0000)_0$.

As described above, the candidate constellation point may be one or more constellation points indicating the same bitstream, and may include the basic constellation point and the extended constellation point. However, if the extended constellation point indicating a specific bitstream does not exist, only the basic constellation point may serve as the candidate constellation point.

Figure 15:
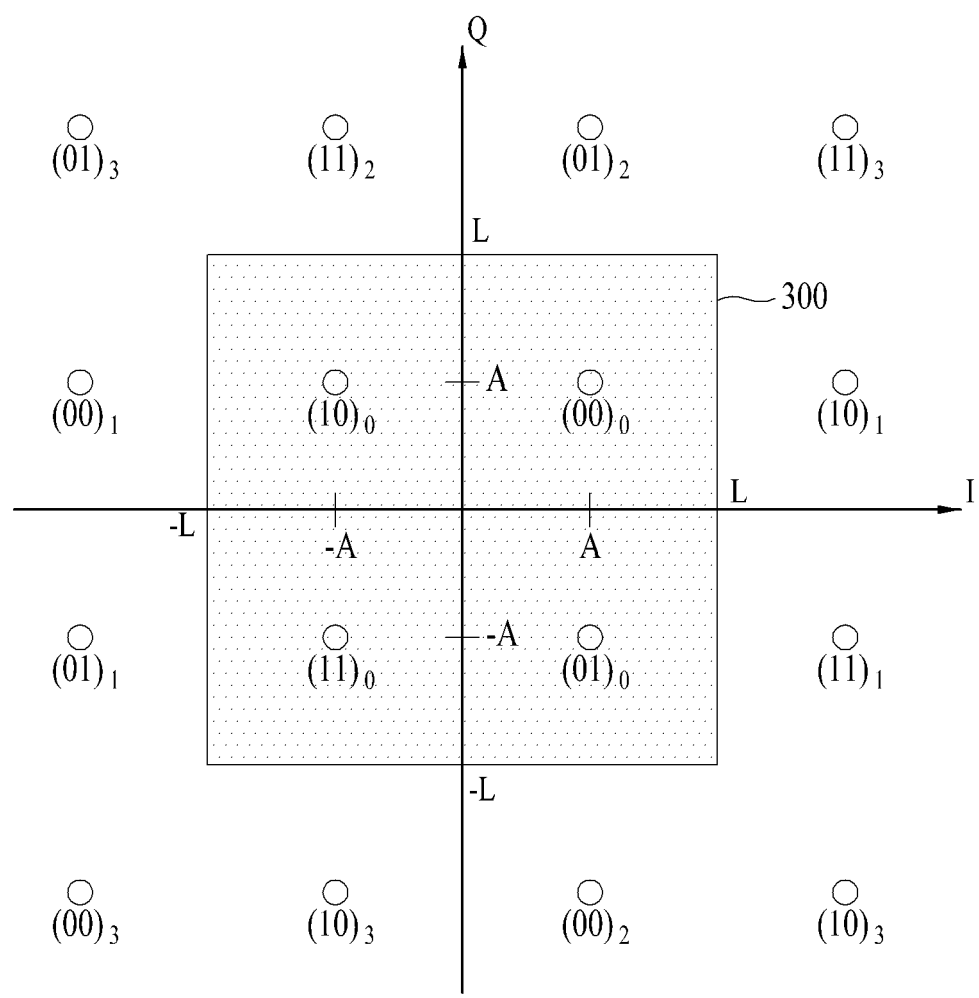
FIG. 15 shows an example of the extended constellation for use in QPSK.

FIG. 15 shows an example of the extended constellation for use in QPSK. Referring to FIG. 15, a general QPSK constellation is mapped to one of four points contained in the modulo box 300 having the width of 2L and the height of 2L. The basic constellation for QPSK may be comprised of four basic constellation points contained in the modulo box 300.

In case of a symbol mapped to the basic constellation, one bit of the symbol is mapped to a real part I and the other one bit of the symbol is mapped to an imaginary part Q, such that the resultant symbol corresponds to information being 2 bits long. For example, a real axis may affect the front bits, and an imaginary axis may affect the rear bits. In other words, if the front bit is set to zero (0), a real value of a signal is set to A. If the front bit is set to 1, a real value of a signal is set to −A. In other words, if the rear bit is set to zero (0), an imaginary value of a signal is set to A. If the rear bit is set to 1, an imaginary value of a signal is set to −A. For example, the basic constellation point located in the basic constellation may correspond to a specific bitstream. If necessary, the same bitstreams may also correspond to other basic constellation points of the basic constellation.

The extended constellation includes basic constellation points of the basic constellation and the extended constellation points. In case of the extended constellation of FIG. 15, after the modulo box of the basic constellation is repeatedly located close to the modulo box of the basic constellation, the extended constellation points located close to constellation points of the basic constellation are selected and generated.

The extended constellation includes candidate constellation points serving as one or more constellation points corresponding to the same bitstream. The extended constellation includes one or more constellation points corresponding to a bitstream to be demapped in the modulo box 300, whereas the basic constellation includes only one constellation point corresponding to a bitstream to be demapped in the modulo box 300. For example, provided that the bitstream to be demapped is set to (00), four candidate constellation points $(00)_0$, $(00)_1$, $(00)_2$ and $(00)_3$, are present in the extended constellation. If the bitstream to be demapped is denoted by (11), four constellation points $(11)_0$, $(11)_1$, $(11)_2$, and $(11)_3$ are present in the extended constellation.

The candidate function (Pi) may be calculated using candidate constellation points of the extended constellation. The candidate function (Pi) numerically represents the possibility of mapping the modulo-operated Rx signal to a specific bitstream.

$$p_i[y \mid x = \alpha] = \frac{1}{\sqrt{2\pi}\,\sigma} \exp\left(-\frac{1}{2}\frac{|y - h(\alpha)_i|^2}{\sigma^2}\right) \quad \text{[Equation 4]}$$

In Equation 4, $\sigma^2$ is noise variance, y is a modulo-operated Rx signal, and h is a channel response. In Equation 4, the candidate function (Pi) may be calculated by substitution of coordinate $(\alpha)_i$ of the candidate constellation point satisfying the bitstream of $(\alpha)$. For example, provided that the bitstream ($\alpha$) to be demapped is set to (00), candidate constellation points of $(\alpha)_i$ are composed of four constellation points $(00)_0$, $(00)_1$, $(00)_2$, and $(00)_3$, $(00)_0$ is a basic constellation point, and $(00)_1$, $(00)_2$ and $(00)_3$ are three extended constellation points. Therefore, four candidate function values (Pi) may be generated by the above-mentioned four constellation points, as represented by Equation 4.

In other words, provided that the bitstream ($\alpha$) to be demapped is set to (00), candidate constellation points corresponding to this bitstream (00) may be composed of four constellation points $(00)_0$, $(00)_1$, $(00)_2$ and $(00)_3$. The coordinate $(\alpha)_i$ of the constellation is substituted into each of the four constellation points, such that the candidate function (Pi) can be calculated. In this case, if $y=h(\alpha)_i$ is satisfied, the candidate function (Pi) may be maximized. Maximizing the candidate function (Pi) means that there is the highest possibility that the constellation symbol transmitted from a transmitter is a specific bitstream corresponding to the corresponding candidate constellation point. Therefore, from among one or more candidate constellation points of the extended constellation, the candidate function (Pi) caused by a candidate constellation point capable of most approximately satisfying an equation $y=h(\alpha)_i$ is calculated. As a result, there is the highest possibility that the constellation point acquired by the calculated candidate function value (Pi) indicates a specific bitstream.

A maximum function value $P_{max}$ from among the generated candidate function values (Pi) can be calculated by the following equation 5.

$$P_{max}[y \mid x = \alpha] = \max_{(\alpha)_i} P_i \qquad \text{[Equation 5]}$$

Referring to FIG. 12, a log-likelihood ratio (LLR) is calculated using the maximum function value $P_{max}$ in step S120. The output of the demapper is not represented by a binary number, or may be represented by the reliability or probability of values (1 and 0) for use in an input bitstream. Therefore, it is possible to calculate an LLR that indicates the reliability or probability of each value 1 or 0 of the k-th bit using the following equation.

$$LLR(b_{R,k}) = \log \frac{\sum_{\alpha \in S^1_{R,k}} P_{max}[y \mid x = \alpha]}{\sum_{\alpha \in S^0_{R,k}} P_{max}[y \mid x = \alpha]} \qquad \text{[Equation 6]}$$

In Equation 6, $\alpha$ is one of coordinates of a constellation symbol of the constellation, $\alpha \in S_{R,k}^0$ is a symbol in which the k-th bit mapped to a real number of the coordinate ($\alpha$) indicates zero (0), and $\alpha \in S_{R,k}^0$ is a symbol in which the k-th bit mapped to a real number of the coordinate ($\alpha$) indicates the value of 1. In Equation 6, a denominator indicates the sum of maximum function values where the k-th bit mapped to one coordinate ($\alpha$) of the constellation symbol is set to zero (0), and a numerator indicates the sum of maximum function values where the k-th bit mapped to one coordinate ($\alpha$) of the constellation symbol is set to '1'. As a result, the higher the denominator, the lower the LLR. And, the higher the numerator, the higher the LLR. The low LLR means that there is a high probability that the k-th bit mapped to one coordinate ($\alpha$) of the constellation symbol becomes zero (0). The high LLR means that there is a high probability that the k-th bit mapped to one coordinate ($\alpha$) of the constellation symbol becomes the value of 1.

The maximum function value ($P_{max}$) of Equation 6 can be calculated using Equation 6. The maximum function value $P_{max}$ satisfying Equation 5 can be calculated using the candidate constellation point of the extended constellation corresponding to a specific bitstream.

For example, an LLR of a first bit when performing demapping of the QPSK mapped symbol can be calculated using the following equation 7:

$$LLR(b_{R,1}) = \log \frac{P_{max}[y \mid x = (10)] + P_{max}[y \mid x = (11)]}{P_{max}[y \mid x = (00)] + P_{max}[y \mid x = (01)]} \qquad \text{[Equation 7]}$$

When calculating the LLR of the first bit, a specific value composed of a denominator and a numerator is logarithmically calculated as denoted by Equation 7. The denominator indicates the sum of maximum function values ($P_{max}$) of bitstreams (00) and (01) each having a first bit of 0, and the numerator indicates the sum of maximum function values ($P_{max}$) of bitstreams (10) and (11) each having a first bit of 1.

In other words, if the maximum function value ($P_{max}$) of each symbol is substituted into Equation 7, an LLR value of the first bit can be calculated. If there is a high possibility that a first bit is set to zero (0), LLR decreases. Otherwise, if there is a high possibility that a first bit is set to '1', LLR increases.

LLR of a second bit can be calculated using the following equation 8.

$$LLR(b_{R,2}) = \log \frac{P_{max}[y \mid x = (01)] + P_{max}[y \mid x = (11)]}{P_{max}[y \mid x = (00)] + P_{max}[y \mid x = (10)]} \qquad \text{[Equation 8]}$$

When calculating LLR of the second bit, a specific value composed of a denominator and a numerator is logarithmically calculated as denoted by Equation 8. The denominator indicates the sum of maximum function values ($P_{max}$) of bitstreams (00) and (10) each having a first bit of 0, and the numerator indicates the sum of maximum function values ($P_{max}$) of bitstreams (01) and (11) each having a first bit of 1. If there is a high possibility that a second bit is set to zero (0), LLR of Equation 8 decreases. Otherwise, if there is a high possibility that a second bit is set to '1', LLR increases.

Therefore, since LLR(bR, 1) and LLR(bR, 2) are calculated as described above, the reliability or probability that the first or second bit is set to 0 or 1 can be calculated. Therefore, the demapper can perform demapping of a reception signal for use in the constellation by LLR(bR, 1) and LLR(bR, 2).

As described above, the demapping method according to one embodiment of the present invention calculates a maximum function value ($P_{max}$) using the candidate constellation point of the extended constellation, calculates an LLR on the basis of the calculated maximum function value ($P_{max}$), and then performs demapping of the calculated result. By means of the extended constellation, the candidate function value (Pi) calculated by Equation 4 can be more correctly calculated. In addition, the number of errors caused by a constellation symbol that moves to the inside of the modulo box using the modulo operation can be reduced by calculating a maximum function value ($P_{max}$) using one or more candidate constellation points. Therefore, when calculating LLR using the maximum function value ($P_{max}$), a relatively correct LLR can be obtained.

As a result, the receiver can more correctly extract the location of a reception signal for use in the constellation obtained from the modulo operation, such that it can perform demapping of the constellation symbol transmitted from the transmitter. Therefore, performance deterioration is reduced in the demapper, and performance can be improved therein.

Table 4 shows a signal to noise ratio (SNR) that changes with an MCS level so as to satisfy a frame error rate (FER) of 10%. In this case, the legacy method indicates an SNR (dB) required when the received DPC-processed signal is demapped by a general demapping method. The proposed method indicates an SNR (dB) required for demapping by the inventive demapping method of one embodiment of the present invention.

TABLE 4

| MCS Level | Legacy Method (dB) | Proposed Method (dB) | Difference (dB) |
| --- | --- | --- | --- |
| MCS 0 (QPSK, 1/8 Coding) | 3.4603 | 2.3091 | 1.1512 |
| MCS 1 (QPSK, 1/6 Coding) | 4.0801 | 2.6205 | 1.4596 |
| MCS 2 (QPSK, 1/4 Coding) | 5.1633 | 3.4794 | 1.6839 |
| MCS 3 (QPSK, 1/3 Coding) | 4.4745 | 4.0797 | 1.6442 |
| MCS 4 (QPSK, 3/7 Coding) | 6.6984 | 4.6930 | 2.0055 |
| MCS 5 (QPSK, 1/2 Coding) | 6.3100 | 5.3589 | 2.2005 |
| MCS 6 (QPSK, 5/9 Coding) | 7.8616 | 5.5531 | 2.3085 |
| MCS 7 (QPSK, 5/8 Coding) | 6.9962 | 6.3201 | 1.9255 |
| MCS 8 (QPSK, 7/10 Coding) | 9.0454 | 6.6986 | 2.3467 |
| MCS 9 (QPSK, 3/4 Coding) | 9.8067 | 7.3389 | 2.4678 |
| MCS 10 (QPSK, 4/9 Coding) | 12.7848 | 8.0465 | 4.7483 |
| MCS 11 (QPSK, 1/2 Coding) | 13.5300 | 8.5738 | 4.9562 |
| MCS 12 (QPSK, 13/24 Coding) | 14.2228 | 9.2461 | 4.9767 |
| MCS 13 (QPSK, 5/8 Coding) | 15.4059 | 10.2171 | 5.1888 |
| MCS 14 (QPSK, 2/3 Coding) | 16.0129 | 10.2391 | 5.7739 |
| MCS 15 (QPSK, 3/4 Coding) | 17.3048 | 11.0872 | 6.2215 |
| MCS 16 (QPSK, 5/6 Coding) | 18.0120 | 12.7021 | 5.3099 |
| MCS 17 (QPSK, 3/5 Coding) | 22.6151 | 13.8120 | 8.8031 |
| MCS 18 (QPSK, 5/8 Coding) | 21.9743 | 14.3230 | 7.6513 |
| MCS 19 (QPSK, 17/25 Coding) | 22.4824 | 15.3110 | 7.1714 |
| MCS 20 (QPSK, 3/4 Coding) | 23.3498 | 16.0875 | 7.2623 |
| MCS 21 (QPSK, 5/6 Coding) | 23.4619 | 17.6534 | 5.8086 |

Referring to Table 4, 22 MCS levels have different coding methods and different modulation schemes. A transfer rate is determined by an MCS level that indicates a level of a predefined modulation and channel coding combination. The MCS level is determined according to a reception SNR. In this case, an MCS level having the highest efficiency is selected according to the SNR.

SNR of the proposed method capable of satisfying 10% FER at all MCS levels is lower than SNR of the legacy method. If it is assumed that the proposed method of one embodiment is performed under a condition for satisfying the same FER, SNR of the proposed method may be less than SNR of the legacy method.

For example, in case of MCS 0, SNR of about 3.46 dB is required for the legacy method, and SNR of about 2.31 dB is required for the proposed method. Therefore, it can be recognized that performance improvement of about 1.15 dB occurs in the proposed method. In case of MCS 17, performance improvement of about 8.80 dB occurs in the proposed method as compared to the legacy method. On average, it can be recognized that performance of the proposed method is superior to performance of the legacy method by about 4.23 dB.

As described above, SNR capable of satisfying 10% FER in the proposed method is relatively lower than that of the legacy method. In order to satisfy the same FER, the legacy method requires a higher SNR as compared to the propose method. In other words, the demapping operation for use in the proposed method causes less performance deterioration as compared to that of the legacy method.

In more detail, in case of performing demapping using the legacy method, a function value is calculated using only a basic constellation point of the basic constellation. A function value (P) based on DPC execution can be obtained by the following equation 9.

$$P[y \mid x = \alpha] = \frac{1}{\sqrt{2\pi}\,\sigma} \exp\left(-\frac{1}{2} \frac{|y - h\alpha|^2}{\sigma^2}\right) \quad \text{[Equation 9]}$$

In Equation 9, if the modulo operation is applied to an input signal, a reception signal (y) moves to the inside of the modulo box.

However, the reception signal (y) obtained by the execution of the modulo operation includes noise, such that the resultant signal may be shifted to another location but not a constellation location used for transmission. In order words, the reception signal moves to the inside of the modulo box according to the modulo operation, and at the same time the reception signal moves to another location but not the location of a constellation symbol used for transmission, such that a function value (P) may be changed as represented by Equation 9. Due to this problem, an unexpected error may occur in LLR calculation.

Errors caused when the transmission symbol transmitted by the DPC is demapped will hereinafter be described with reference to the attached drawings.

Figure 16:
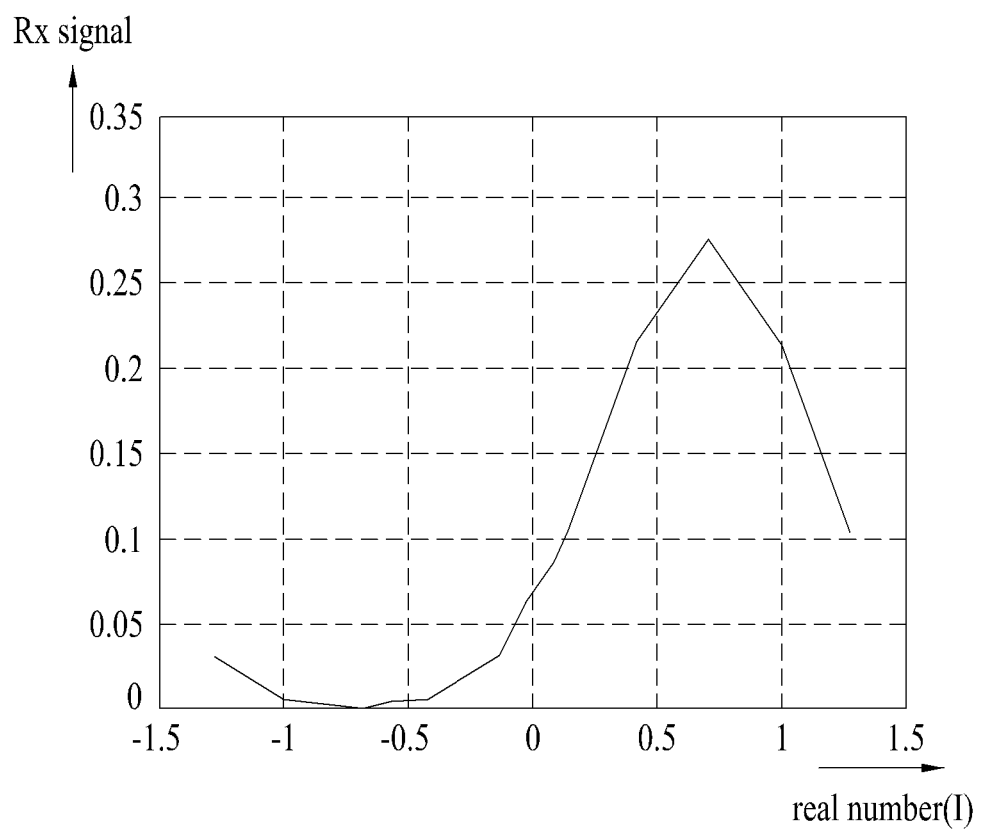
FIG. 16 is a graph illustrating a reception signal caused by a modulo operation applied to QPSK-mapped symbols under the condition that noise has Gaussian distribution.

FIG. 16 shows a reception signal caused by a modulo operation applied to QPSK-mapped symbols under the condition that noise has Gaussian distribution. Referring to FIG. 16, the transmitter transmits a symbol (00), and the modulo operation is performed on an objective signal when SNR is set to 5 dB, such that the resultant signal is received. The graph of FIG. 16 can be obtained by simulation of distribution of a real number of the received signal. In this case, A is denoted by $1/\sqrt{2}$ corresponding to about 0.707.

In FIG. 16, a horizontal axis indicates a real number marked on the constellation, and a vertical axis indicates a modulo-operated reception signal.

Referring to FIG. 16, the symbol (00) may include Gaussian noise. The modulo operation is applied to the reception signal including noise. Upon completion of the modulo operation, noise does not include Gaussian distribution any longer, because the reception signal located outside of the modulo box mandatorily goes inside of the modulo box due to execution of the modulo operation.

Therefore, it is possible to acquire a reception signal that has Gaussian distribution in the range of ±0.5 on the basis of the value A corresponding to about 0.707. The reception signal includes no Gaussian distribution in the remaining ranges located outside of the above range of ±0.5 on the basis of the value A. In addition, the right edge part is mandatorily severed by the modulo operation.

As described above, if a real number of the signal received by the modulo operation is set to A, LLR is maximized. If the real number of the received signal deviates from the value of A, LLR is reduced together with Gaussian distribution. However, the left part of FIG. 16 does not include Gaussian distribution, and LLR of the reception signal becomes zero and increases again from zero, such that movement of the reception signal is shaped as a tail.

Figure 17:
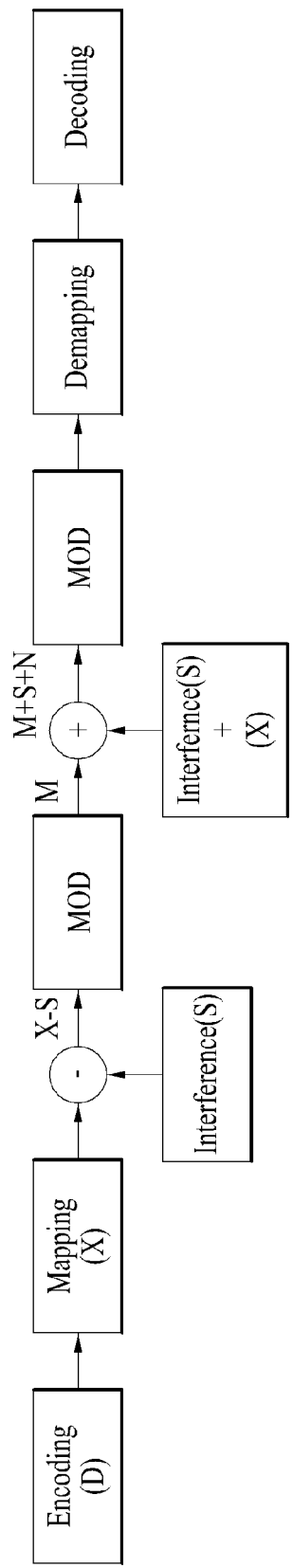
FIG. 17 is a conceptual diagram illustrating Dirty Paper Coding (DPC) using a modulo operator combined with channel encoding.

FIG. 17 is a conceptual diagram illustrating Dirty Paper Coding (DPC) using a modulo operator combined with channel encoding.

Referring to FIG. 17, DPC using the modulo operator combined with channel encoding is operated in the following order.

First, information data of the user is changed to D after passing through channel coding, and is mapped to a constellation point, such that the resultant data X is generated.

Thereafter, if known interference S is subtracted from the resultant data X, signal energy may increase, such that the signal can be sent to one point contained in a specific box through the modulo operation.

The modulo-operated signal is added to the known interference through a channel, and an additive white Gaussian noise (AWGN) is also added the resultant signal, such that the reception signal of the receiver is denoted by (M+S+N). The modulo operation is re-applied to the reception signal (M+S+N), such that the resultant signal is denoted by ($\hat{X}$).

In addition, after the ($\hat{D}$) channel code decoding for converting symbol level information into bit level information is applied to the signal ($\hat{X}$), transmission data is estimated.

In FIG. 17, the demapper estimates the reception signal as one point from among the constellation coordinates, such that it the estimated value obtained by conversion from the symbol level information into bit level information can be changed or switched. In this case, a hard decision method for acquiring the hard output by deciding the value of 1 or 0 may be applied to the resultant signal, or a soft decision method for acquiring the soft output using the probability value may also be applied thereto.

Equations 4 and 6 are used when outputting the soft value as an output signal. That is, assuming that a transmission signal is set to X, a channel response is set to h, additive white Gaussian noise (AWGn) is set to n, a reception signal (y) is denoted by y=hx+n and noise variance is denoted by $\sigma^2$, the log-likelihood ratio (LLR) can be represented by the following equations.

$$LLR(b_{R,k}) = \log \frac{\sum_{\alpha \in S_{R,k}^1} P[y | x = \alpha]}{\sum_{\alpha \in S_{R,k}^0} P[y | x = \alpha]}$$ [Equation]

$$P[y | x = \alpha] = \frac{1}{\sqrt{2\pi}\,\sigma} \exp\left(-\frac{1}{2} \frac{|y - h\alpha|^2}{\sigma^2}\right)$$

In Equation, $\alpha$ is one of coordinates contained in the constellation, $\alpha \in S_{R,k}^0$ is a symbol where the k-th bit mapped to a real number of the coordinate ($\alpha$) is set to the bit '0', and $\alpha \in S_{R,k}^0$ is a symbol where the k-th bit mapped to a real number of the coordinate $\alpha$ is set to the bit '1'.

For example, it is assumed that a QPSK symbol is mapped to the constellation.

Figure 18:
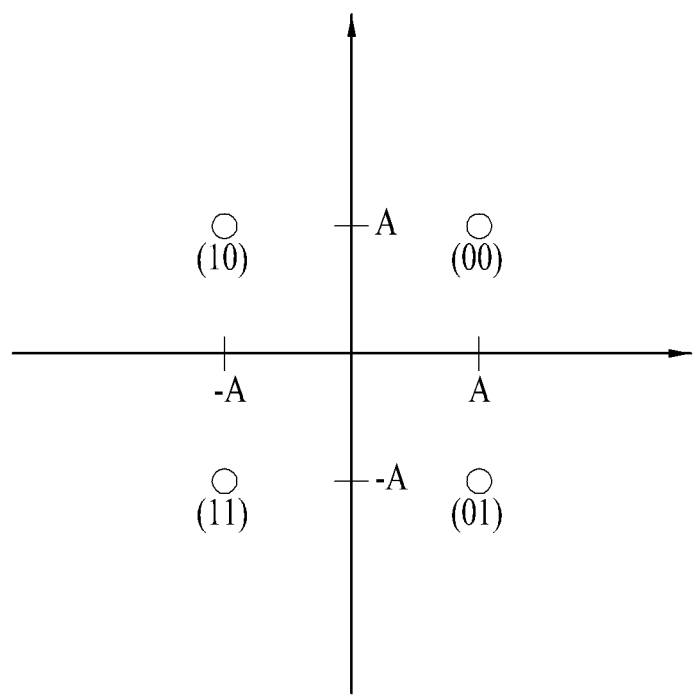
FIG. 18 shows exemplary QPSK symbols mapped to a constellation according to an embodiment of the present invention.

Referring to FIG. 18, the number of bits to be mapped to a real part is only one bit, and the number of bits to be mapped to an imaginary part is only one bit, such that a total of 2-bit information may be mapped to four constellation points.

The real axis affects the front bit, and the imaginary axis affects the rear bit. In other words, if the front bit is set to '0', a real number of the signal is set to A. If the front bit is set to '1', a real number of the signal is set to –A. If the rear bit is set to '0', an imaginary part of the signal is set to A. If the rear bit is set to '1', an imaginary part of the signal is set to –A.

In other words, in order to calculate the probability of the first bit, the following equations are needed.

$$LLR(b_R) = \log \frac{P[y | x = (10)] + P[y | x = (11)]}{P[y | x = (00)] + P[y | x = (01)]}$$ [Equation]

$$LLR(b_{R,k}) = \log \frac{\sum_{\alpha \in S_{R,k}^1} P[y | x = \alpha]}{\sum_{\alpha \in S_{R,k}^0} P[y | x = \alpha]}$$

$$P[y | x = \alpha] = \max_{(\alpha)_i}\left\{\frac{1}{\sqrt{2\pi}\,\sigma} \exp\left(-\frac{1}{2} \frac{|y - h(\alpha)_i|^2}{\sigma^2}\right)\right\}$$

In other words, the probability of x=$\alpha$ corresponds to the highest probability from among candidates ($\alpha$)$_i$ of the repeated value ($\alpha$). The candidates ($\alpha$)$_i$ indicate the constellation points extended (or repeated) by the modulo operation, as represented by the following equation.

$$\begin{aligned}z &= LLR \\ &= \log\frac{P[b=0|y]}{P[b=1|y]} \\ &= \log\frac{P[y|b=0]P[b=0]P[y]}{P[y|b=1]P[b=1]P[y]} \\ &= \log\frac{\frac{1}{\sqrt{2\pi\sigma_n^2}}\left(\sum_{k=-\infty}^{\infty}\exp\left(-\frac{(y-1+2Lk)^2}{2\sigma_n^2}\right)\right)}{\frac{1}{\sqrt{2\pi\sigma_n^2}}\left(\sum_{k=-\infty}^{\infty}\exp\left(-\frac{(y+1+2Lk)^2}{2\sigma_n^2}\right)\right)} \\ &\approx \log\frac{\left(\exp\left(-\frac{(y-1)^2}{2\sigma_n^2}\right) + \exp\left(-\frac{(y+3)^2}{2\sigma_n^2}\right)\right)}{\left(\exp\left(-\frac{(y+1)^2}{2\sigma_n^2}\right) + \exp\left(-\frac{(y-3)^2}{2\sigma_n^2}\right)\right)}\end{aligned}$$ [Equation]

In Equation, original constellation is BPSK (±1 transmission), and L is the size of a modulo box.

In association with the encoding and decoding, block code series such as LDPC code and Hamming code and Trellis series such as convolutional code and turbo code may be used as channel encoding. In addition, the LLR value derived from the demapping is input to the decoder, such that it is decoded by the decoder.

One of algorithms for implementing DPC is a modulo operation method. That is, interference to be added must be deducted from an output signal of the transmitter, and the resultant signal needs to be transmitted. In this case, since Tx power may increase by interference, the Tx power is limited through the modulo operation, as represented by the following equation.

$$M = (X-S)_{mod} = (X-S) + aL + j*bL$$ [Equation]

In Equation, L is the size of a half of the modulo box, and each of a and b is an integer.

As a result, Y=M+S+N=(X–S)+aL+j*bL+S+N=X+N+aL+j*bL is achieved. If the modulo operation is performed on the resultant signal, $\hat{X}$=X+N+cL+j*dL is achieved (where each of c and d is an integer).

Figure 19:
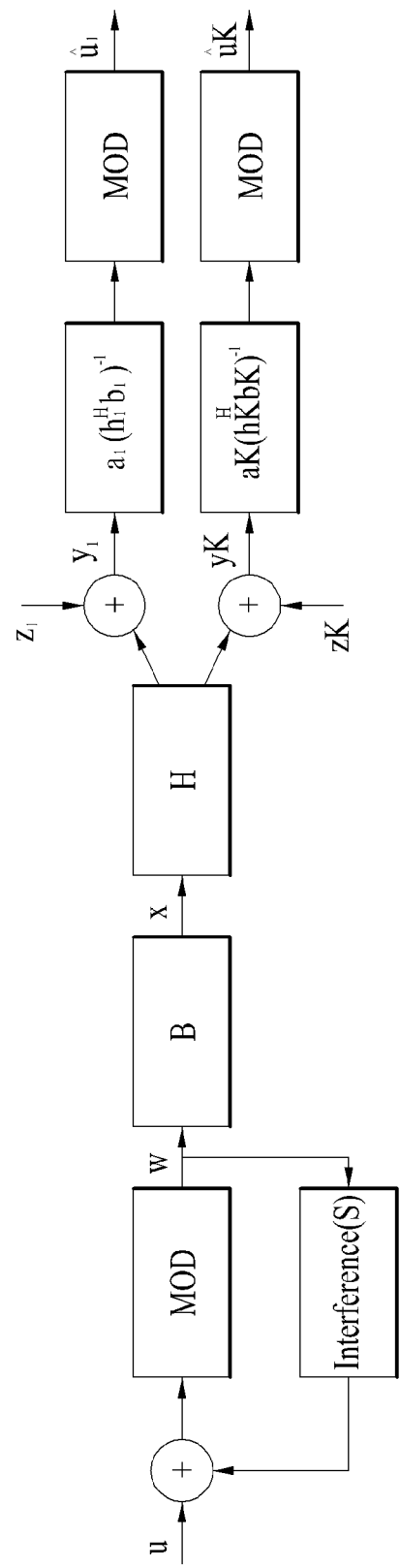
FIG. 19 is a block diagram illustrating a system model in case of MISO-THP according to an embodiment of the present invention.

A system model for use in MISO-THP will hereinafter be described with reference to FIG. 19.

Two methods for calculating B matrix may be used in the MISO-THP system model.

First, the B matrix can be calculated using duality.

The method for calculating the B matrix using duality is represented by the following equation.

$$w_i = u_i - \sum_{j=i+1}^{K} g_{ij} w_j \mathrm{mod}(-L_i, L_i),$$ [Equation]

$$\sigma_{wi}^2 = 2L_i^2/3,$$

for $i \neq K$, $$E[w_i w_j^*] = \sigma_{wi}^2 \delta_{ij},$$

$$R_w = E[ww^H] = \mathrm{diag}(\sigma_{w1}^2, \ldots, \sigma_{wK}^2)$$

$$y_i = h_i x + z_i = h_i b_i w_i + h_i \sum_{i \neq j} b_j w_j + z_i,$$

-continued $i = 1, \ldots, K,$ $h_i \in C^{t \times 1},$ $x \in C^{t \times 1},$ $$\hat{x}_i = \frac{y_i}{h_i b_i} = \left(w_i + \frac{h_i \sum_{i \neq j} b_j w_j}{h_i b_i} + \frac{z_i}{h_i b_i}\right)_{modi}$$

In Equation, K is the number of users, each of which can be encoded at a time (it is assumed that a single user can receive a single stream), Li is the size of a modulo box of the user (i), and t is the number of Tx antennas.

In this case, a signal of the $(K-1)^{th}$ user can be recovered as represented by the following equation.

$$\hat{u}_{K-1} = \left(w_{K-1} + \frac{h_{K-1} b_K w_K}{h_{K-1} b_{K-1}} + \frac{h_{K-1} \sum_{j \neq K, K-1} b_j w_j}{h_{K-1} b_{K-1}}\right)_{modK-1}$$

$$= \left(u_{K-1} - g_{K-1,K} u_K + \frac{h_{K-1} b_K u_K}{h_{K-1} b_{K-1}} + \alpha L_i + j * \beta L_i + \frac{h_{K-1} \sum_{j \neq K, K-1} b_j w_j}{h_{K-1} b_{K-1}}\right)_{modK-1}$$

In addition, if a user desires to completely remove interference, G matrix may be decided as follows.

$$h_i \sum_{j=i+1}^{K} b_j w_j = 0 \Rightarrow g_{ij} = \frac{h_i b_j}{h_i b_i}$$

If a user desires to partially remove interference, G matrix may be decided as follows.

$$g_{ij} = \alpha_i \frac{h_i b_j}{h_i b_i}, \; \alpha_i = \frac{\sigma_{wi}^2 |h_i b_i|^2}{1 + \sum_{j=1}^{i} \sigma_{wj}^2 |h_i b_j|^2}.$$

In this case, the $i^{th}$ column of the B matrix can be obtained as follows.

$$A_i = \left(I + H_i \left(\sum_{j=1}^{i-1} S_j\right) H_i^H\right),$$

$$B_i = \left(I + \sum_{j=i+1}^{K} H_j^H P_j H_j\right)$$

$$S_i = B_i^{-1/2} F_i G_i^H A_i^{1/2} P_i A_i^{1/2} G_i F_i^H B_i^{-1/2},$$

where $F_i$ and $G_i$ is derived by SVD of $B_i^{-1/2} H_i^H A_i^{-1/2} = F_i A_i G_i^H$ $$S_i = \lambda_i v_i v_i^H, \; b_i = \frac{\sqrt{\lambda_i}}{\sigma_{wi}} v_i$$

In this case, the encoding is performed in the order from the $K^{th}$ user to the first user. Herein, the $K^{th}$ user may not be processed by the modulo encoding.

In addition, the B matrix may be obtained through ZF or QR method, as represented by the following equation.

$$w_i = u_i - \sum_{j=1}^{i-1} g_{ij} w_j \text{mod}(-L_i, L_i),$$ [Equation]

$\sigma_{wi}^2 = 2L_i^2/3,$ for $i \neq 1,$ $\sigma_{w1}^2 = 1,$ $E[w_i w_j^*] = \sigma_{wi}^2 \delta_{ij},$ $R_w = E[ww^H] = \text{diag}(\sigma_{w1}^2, \ldots, \sigma_{wK}^2)$

[Equation]

-continued $y_i = h_i x + z_i = h_i b_i w_i + h_i \sum_{i \neq j} b_j w_j + z_i,$ $i = 1, \ldots, K,$ $h_i \in C^{t \times 1},$ $x \in C^{t \times 1},$ $$\hat{x}_i = \frac{y_i}{h_i b_i} = \left(w_i + \frac{h_i \sum_{i \neq j} b_j w_j}{h_i b_i} + \frac{z_i}{h_i b_i}\right)_{modi}$$

In addition, a signal of the second user can be recovered as represented by the following equation.

$$\hat{u}_2 = \left(w_2 + \frac{h_2 b_1 w_1}{h_2 b_1} + \frac{h_2 \sum_{j \neq 1,2} b_j w_j}{h_2 b_2}\right)_{mod2}$$ [Equation]

$$= \left(u_2 - g_{21} u_1 + \frac{h_2 b_1 u_1}{h_2 b_2} + \alpha L_i + j * \beta L_i + \frac{h_2 \sum_{j \neq 1,2} b_j w_j}{h_2 b_2}\right)_{mod2}$$

In this case, if a user desires to completely remove interference, G matrix may be set as follows.

$$h_i \sum_{j=1}^{i-1} b_j w_j = 0 \Rightarrow g_{ij} = \frac{h_i b_j}{h_i b_i}$$

In conclusion, B matrix can be calculated as follows.

$$H = \begin{bmatrix} h_1^T \\ \vdots \\ h_K^T \end{bmatrix},$$

$$h_i \in \Box^{t \times 1},$$

$$H = RQ,$$

$$[Q, R] = qr(H^H)$$

$$B = [\, b_1 \quad b_2 \quad \ldots \quad b_K \,]$$

$$= \left[\, \sqrt{P_1}\, Q(:,1) \quad \sqrt{\frac{3P_2}{2L_2^2}}\, Q(:,2) \quad \ldots \quad \sqrt{\frac{3P_K}{2L_k^2}}\, Q(:,K) \,\right],$$

$$\sum_{i=1}^{K} P_i = P$$

In this case, encoding is performed in the order from the first user to the $K^{th}$ user. The first user does not perform the modulo operation.

Figure 20:
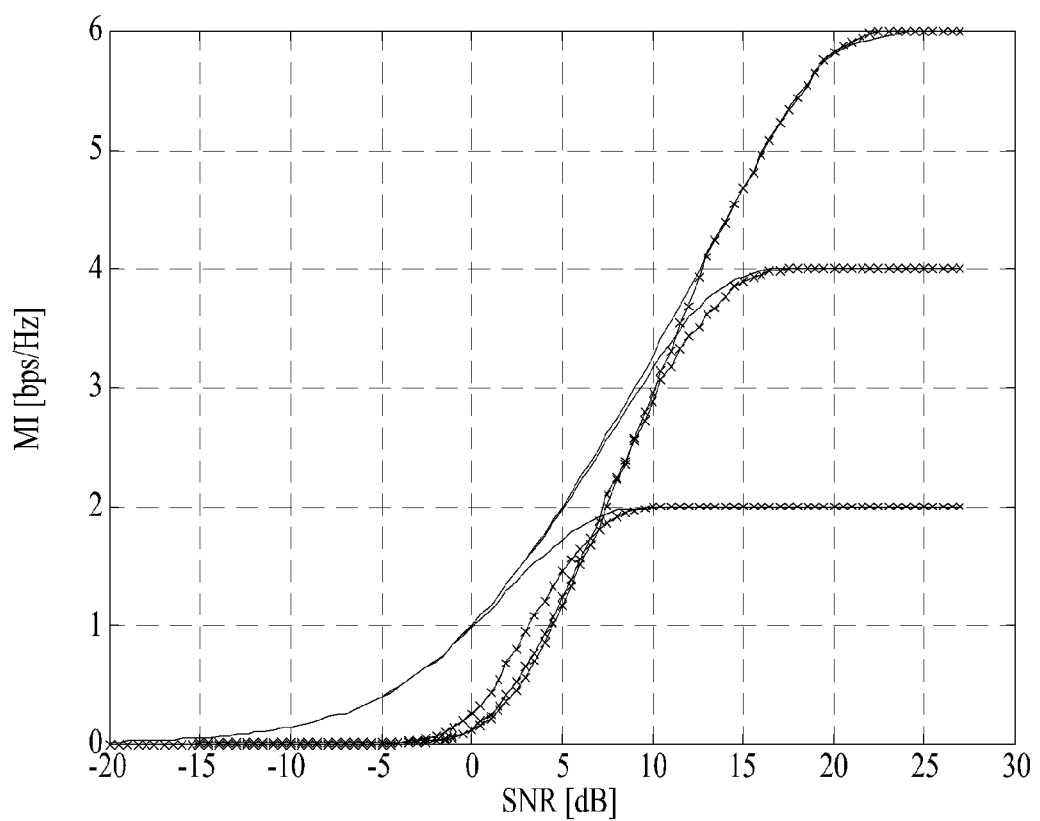
FIG. 20 shows exemplary mutual information indicating a maximum transmission value for each SNR according to an embodiment of the present invention.

FIG. 20 shows exemplary mutual information indicating a maximum transmission value for each SNR according to an embodiment of the present invention.

Referring to FIG. 20, it can be easily recognized that performance is reduced at a low SNR due to the modulo operation, because the constellation point is repeatedly generated on the constellation and the number of nearest neighbors capable of affecting such performance also is also increased.

In case of using the modulo operation, power is uniformly distributed in the modulo box. Therefore, actual Tx power ($E[M^H M]=2/3\ L^2$) becomes higher than an original value $E[X^H*X]$ (where L is the size of the modulo box).

Figure 21:
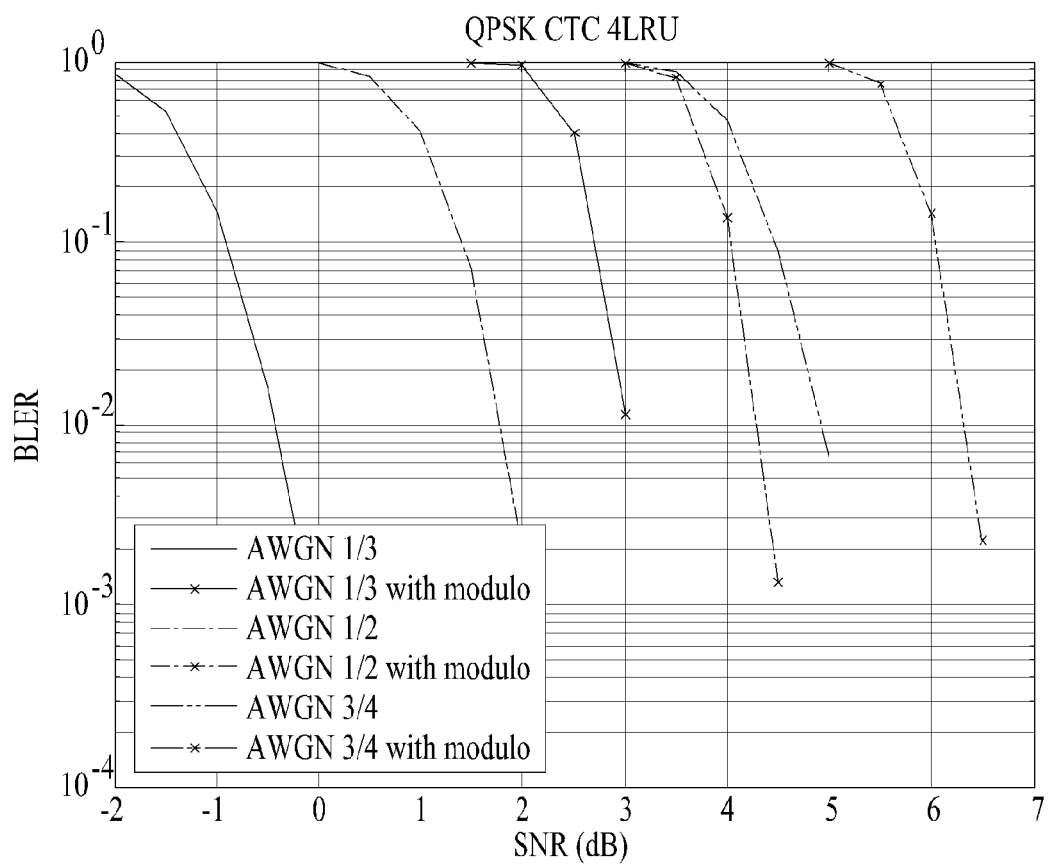
FIG. 21 shows exemplary performance of a system coded for each SNR according to an embodiment of the present invention.

FIG. 21 shows exemplary performance of a system coded at each SNR according to an embodiment of the present invention.

FIG. 21 shows performance of the actually coded system.

Referring to FIG. 21, in case of QPSK, there is a difference in performance. That is, as can be seen from FIG. 21, QPSK may have a performance difference ranging from 1.5 dB to 3.5 dB.

Provided that interference power is lower than power loss caused by the modulo operation, it is preferable in terms of performance that a signal is transmitted with interference without being modulo-operated.

Therefore, the present invention provides a method for determining whether the modulo operation is to be adaptively applied to each UE according to a UE condition (e.g., CQI, channel status, etc.), a condition of another UE, etc. such that it can inform the UE of whether to perform the modulo operation.

In this case, information receivable in the UE may include the sum of mutual information capable of being received in each user, the sum of throughputs, weighted sum mutual information including even user priority (e.g., priority calculated by a proportional fair algorithm), weighted sum rate, weighted sum throughput, etc.

In this case, if encoding is performed using a THP method, the encoded result may information a user of specific information indicating a total number of streams to be transmitted to the user.

In addition, the corresponding user may also transmit information as to which one of streams is used.

In case of the ZF-THP system, operations related to the modulo operation may not be performed for the first stream as necessary.

In case of the THP system using duality, operations related to the modulo operation may not be performed for the last stream as necessary.

If necessary, irrespective of the THP method for use in the system, operations related to the modulo operation may not be performed for the first or last stream.

In this case, in case of other streams, information as to whether the modulo operation is performed may be indicated by one bit.

In addition, information as to whether the modulo operation is applied to all streams may be denoted by one bit.

Next, application examples for use in QR-THP will hereinafter be described in detail.

For convenience of description and better understanding of the present invention, it is assumed that a total of available power is set to P and a total of two users can be simultaneously supported.

In case of performing power control, if (p_i) is allocated to the $i^{th}$ user, 'sum(p_i)<=P' is achieved.

In addition, it is assumed that MI(snr_i) is mutual information at snr_i under the condition of no modulo operation, and MI_M(snr_i) is mutual information at snr_i under the condition of the modulo operation.

In this case, a first user does not perform the modulo operation, such that a maximum rate capable of being obtained by the first user is denoted by MI(snr_1).

That is, snr_1=p1*|R(1,1)|^2 is achieved wherein it is assumed that noise power is scaled to 1 and signal power is also scaled to 1. In addition, R(1,1) serves as $(1,1)^{th}$ element of the matrix R.

If a second user performs the modulo operation, MI_M (snr_2) is achieved, where snr_2 is identical to p2*|R(2,2)|^2*3/(2L^2).

If the second user does not perform the modulo operation, MI(snr_2') is achieved, where snr_2' is identical to p2*|R(2,2)|^2/(p1*|R(1,2)|^2+1).

In addition, if MI_M(snr_2) is higher than MI(snr_2'), the modulo operation may be performed on the second user. If MI_M(snr_2) is equal to or lower than MI(snr_2'), the modulo operation may not be performed on the second user.

In addition, the B matrix may be multiplied by a dedicated pilot and the multiplied result may be transmitted.

In addition, the precoding matrix B may be transmitted to each user or the precoding vector (bi) of the corresponding user may be transmitted as necessary.

Meanwhile, PHY (physical layer) abstraction is used to estimate performance of a link layer using the correct and simple method.

PHY abstraction must be correctly performed, must be simple in computing, and must be independently performed irrespective of channel models. In addition, PHY abstraction must be applicable to interference environments, and must be applicable to multi-antenna processing.

Specifically, the PHY abstraction method is used to correctly estimate the coded block error rate (BLER) of OFDM subcarriers used for transmitting the coded FEC block.

In order to correctly estimate a block error rate (BLER), SINR values of input signals for the FEC decoder may be considered to be input signals of PHY abstraction mapping.

Specifically, link level curve values are generated on the assumption of a frequency flat channel response corresponding to a given SINR, a new concept for an effective SINR (i.e., $SINR_{eff}$) is needed.

$SINR_{eff}$ is required when a system level SINR is correctly mapped to link level curves, such that the resultant BLER that is capable of being applied irrespective of environments can be decided.

In addition, the $SINR_{eff}$-based mapping method may also be defined through effective SINR mapping (ESM). For convenience of description and better understanding of the present invention, the above $SINR_{eff}$-based mapping method will hereinafter be referred to as ESM.

For example, there are two ESM application methods, and a detailed description thereof will hereinafter be described.

That is, a first ESM method using 'CQI measurement (link estimation) based on measurement' and a second ESM method using 'packet error rate estimation' based on a reception signal may be used as the ESM application methods.

$SINR_{eff}$ will hereinafter be described with reference to an example of the system model.

First of all, it is assumed that the system model is denoted by Y=HX+U. In this case, Y is a received signal vector ($N_R \times 1$), H is a channel matrix ($N_R \times N_T$), X is a transmitted symbol stream ($N_T \times 1$), U is ($N_R \times 1$) is including noise vector (or interference).

In the above-mentioned system model, $SINR_{eff}$ may be denoted by the following equation 10.

$$SINR_{eff} = \Phi^{-1}\left\{\frac{1}{N}\sum_{n=1}^{N}\Phi(SINR_n)\right\}$$

In multi-input ESM (MI-ESM or MMIB), a function $\Phi( )$ of Equation 10 can be obtained through a constrained capacitor. On the other hand, in case of EESM, the function $\Phi( )$ may be calculated through 'Chernoff bound on the probability of error'.

As described above, in MI-ESM(MMIB) environment, the function $\Phi( )$ is determined through the constrained capacity irrespective of other elements.

In this case, the constrained capacity may be considered to be Gaussian channel based mutual information using Gaussian inputs.

Specifically, the modulation constrained capacity may be considered to be a symbol channel (for example, a channel constrained by input symbols because of a composite set), and a detailed description thereof will hereinafter be described with reference to FIG. 22.

Figure 22:
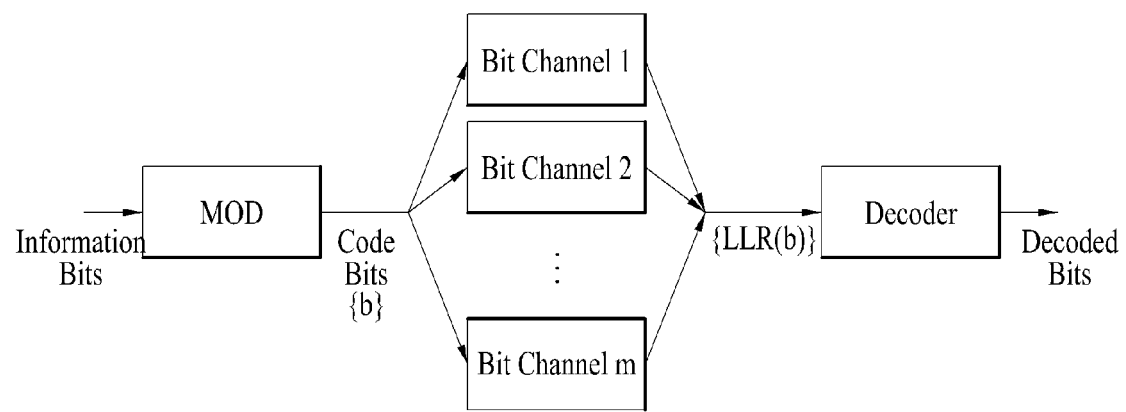
FIG. 22 is a conceptual diagram illustrating an exemplary coding and decoding process using coded bits according to an embodiment of the present invention.

FIG. 22 is a conceptual diagram illustrating an exemplary coding and decoding process using coded bits according to an embodiment of the present invention.

Figure 23:
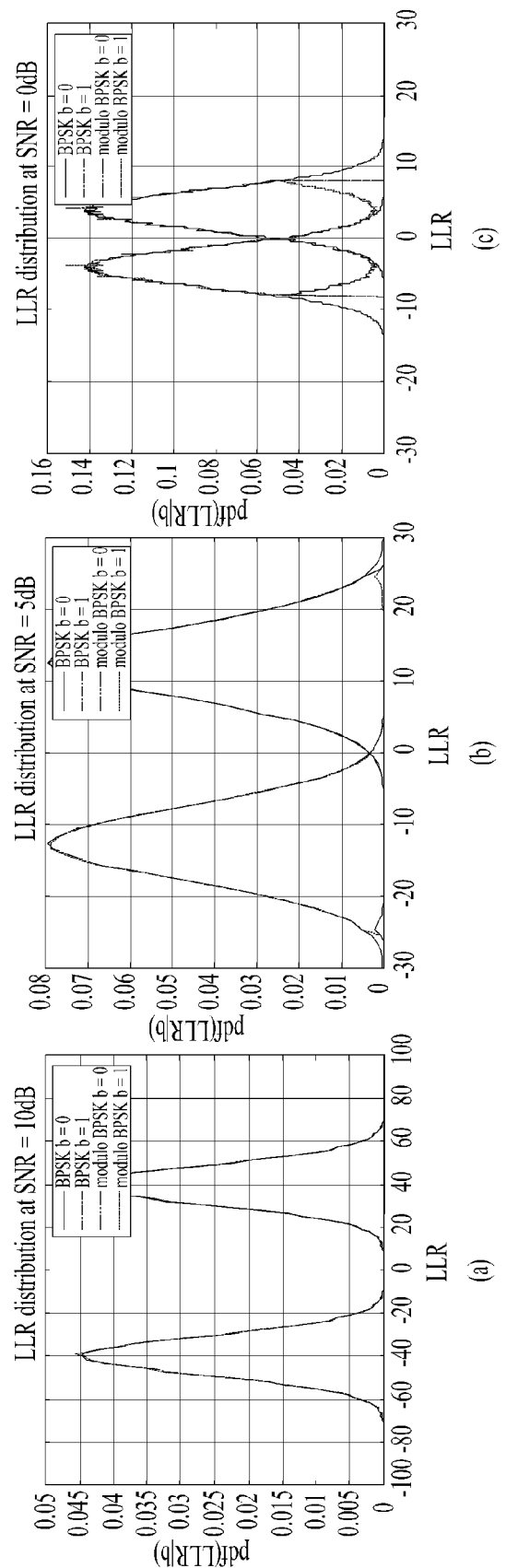
FIG. 23 shows exemplary LLR distribution according to an embodiment of the present invention.

Referring to FIG. 23, $LLR(b_i)$ is represented by the following equation 11.

$$LLR(b_i) = \ln\left(\frac{P(b_i=1|y)}{P(b_i=0|y)}\right) = \ln\left(\frac{P(y|b_i=1)}{P(y|b_i=0)}\right) \quad \text{[Equation 11]}$$

In addition, mutual information for use in an equivalent channel may be represented by the following equation 12.

$$I(b, LLR) = \frac{1}{m}\sum_{i=1}^{m}I(b_i, LLR(b_i)) \quad \text{[Equation 12]}$$

In Equation 12, I(b, LLR) is mutual information between an $i^{th}$ input bit of the modulation map and an output LLR.

In addition, mean mutual information may be represented by the following equation 13.

$$MI = \frac{1}{mN}\sum_{n=1}^{N}\sum_{i=1}^{m}I(b_i^{(n)}, LLR(b_i^{(n)})) \quad \text{[Equation 13]}$$

$$= \frac{1}{N}\sum_{n=1}^{N}I_m(SINR_n)$$

The function $\Phi( )$ of Equation 10 may be decided using the above-mentioned mutual information, such that $SINR_{eff}$ can be calculated.

Mutual information for use in BPSK and QPSK will hereinafter be described in detail.

In this case, the mutual information between the coded bit value (b) and LLR may be achieved by subtracting one uncertainty of the coded bit value (b) (wherein a given LLR can be used) from another uncertainty of the coded bit value (b). In addition, H(b) may be identical to 1, as represented by H(b)=1.

Therefore, the mutual information can be represented by the following equation 14.

$$I(b,LLR)=H(b)-H(b|LLR) \quad \text{[Equation 14]}$$

Mutual information for use in BPSK and QPSK can be calculated using the following equation 14.

$$H(LLR|b) = \frac{1}{2}\int_{-\infty}^{\infty}p_{LLR}(z|b=1)\log_2[p_{LLR}(z|b=1)]dz + \quad \text{[Equation 14]}$$

$$\frac{1}{2}\int_{-\infty}^{\infty}p_{LLR}(z|b=0)\log_2[p_{LLR}(z|b=0)]dz$$

$$I(b, LLR) = \frac{1}{2}\sum_{b=0,1}\int_{-\infty}^{\infty}p_{LLR}(z|b)$$

$$\log_2\left[\frac{2p_{LLR}(z|b)}{p_{LLR}(z|b=0)+p_{LLR}(z|b=1)}\right]dz,$$

$y = x + n$, and $$E[|x|^2] = 1, E[|n|^2] = \sigma_n^2 = \frac{1}{(2E_s/N_0)} = \frac{N_0}{2}.$$

In other words, because of 'y=x+n' and 'SNR=$E_x/N_0$=1/$\sigma_n^2$=1/($\sigma_{n,R}^2/2$)=2/$\sigma_{n,R}^2$', LLR can be defined as follows.

In BPSK, if b is set to zero (i.e., b=0), z is denoted by $$z = LLR = \log\frac{P[b=0|y]}{P[b=1|y]}.$$

If b is set to 1 (i.e., b=1), z is denoted by $$z = LLR = \log\frac{P[b=1|y]}{P[b=0|y]}.$$

If b is set to 1 (i.e., b=1), z is denoted by $$z = LLR = \log\frac{P[b=1|y]}{P[b=0|y]}.$$

If b is set to zero (i.e., b=0), the following equation may be achieved.

$$z = LLR \quad \text{[Equation]}$$

$$= \log\frac{P[b=0\mid y]}{P[b=1\mid y]}$$

$$= \log\frac{P[y\mid b=0]P[b=0]P[y]}{P[y\mid b=1]P[b=1]P[y]} \quad \text{(Bayes rule)}$$

$$= \log\frac{\frac{1}{\sqrt{2\pi\sigma_n^2}}\exp\left(-\frac{(y-1)^2}{2\sigma_n^2}\right)}{\frac{1}{\sqrt{2\pi\sigma_n^2}}\exp\left(-\frac{(y+1)^2}{2\sigma_n^2}\right)}$$

$$\left(\text{Gaussian pdf} = \frac{1}{\sqrt{2\pi\sigma^2}}\exp\left(-\frac{(x-\mu)^2}{2\sigma^2}\right)\right)$$

$$= \log\exp\left(\frac{2y}{\sigma_n^2}\right)$$

$$= \frac{2y}{\sigma_n^2}$$

$$= \frac{2}{\sigma_n^2}(x+n)$$

In Equation, z is Gaussian R.V including both a mean value $$\frac{2}{\sigma_n^2}$$

and variance $$\frac{4}{\sigma_n^2}.$$

If b=1, the above equation can be simplified as follows:

$$z = LLR$$

$$= \log\frac{P[b=1\mid y]}{P[b=0\mid y]}$$

$$= \log\frac{\frac{1}{\sqrt{2\pi\sigma_n^2}}\exp\left(-\frac{(y+1)^2}{2\sigma_n^2}\right)}{\frac{1}{\sqrt{2\pi\sigma_n^2}}\exp\left(-\frac{(y-1)^2}{2\sigma_n^2}\right)}$$

$$= \log\exp\left(-\frac{2y}{\sigma_n^2}\right)$$

$$= -\frac{2y}{\sigma_n^2}$$

$$= -\frac{2}{\sigma_n^2}(x+n).$$

where z is Gaussian R.V including both a mean value $$-\frac{2}{\sigma_n^2}$$

and variance $$\frac{4}{\sigma_n^2}.$$

That is, p(z|b=0)=p(−z|b=1) and $$p(z\mid b=0) = \frac{1}{\sqrt{2\pi\sigma^2}}\exp\left(-\frac{(z-2/\sigma_n^2)^2}{2\sigma^2}\right)$$

are achieved.

In addition, in association with I(b; z)=H(z)−H(z|b), the following equations may be achieved.

$$H(z) = -\int_{-\infty}^{\infty} p(z)\log_2 p(z)dz \quad \text{[Equation]}$$

$$= -\int_{-\infty}^{\infty} p(z\mid b=0)p(b=0)\log_2(p(z\mid b=0)p(b=0) + p(z\mid b=1)p(b=1))dz -$$

$$\int_{-\infty}^{\infty} p(z\mid b=1)p(b=1)\log_2(p(z\mid b=0)p(b=0) + p(z\mid b=1)p(b=1))dz$$

$$= -\frac{1}{2}\int_{-\infty}^{\infty} p(z\mid b=0)\log_2\left(\frac{1}{2}p(z\mid b=0) + \frac{1}{2}p(z\mid b=1)\right)dz -$$

$$\frac{1}{2}\int_{-\infty}^{\infty} p(z\mid b=1)\log_2\left(\frac{1}{2}p(z\mid b=0) + \frac{1}{2}p(z\mid b=1)\right)dz$$

$$= -\frac{1}{2}\int_{-\infty}^{\infty} p(z\mid b=0)\log_2\left(\frac{1}{2}p(z\mid b=0) + \frac{1}{2}p(z\mid b=1)\right)dz -$$

$$\frac{1}{2}\int_{-\infty}^{\infty} p(-z'\mid b=1)\log_2\left(\frac{1}{2}p(-z'\mid b=0) + \frac{1}{2}p(-z'\mid b=1)\right)dz'$$

$$= -\frac{1}{2}\int_{-\infty}^{\infty} p(z\mid b=0)\log_2\left(\frac{1}{2}p(z\mid b=0) + \frac{1}{2}p(z\mid b=1)\right)dz -$$

$$\frac{1}{2}\int_{-\infty}^{\infty} p(z\mid b=0)\log_2\left(\frac{1}{2}p(z\mid b=1) + \frac{1}{2}p(z\mid b=0)\right)dz$$

-continued $$= -\int_{-\infty}^{\infty} p(z|b=0)\log_2\left(\frac{1}{2}p(z|b=0) + \frac{1}{2}p(z|b=1)\right)dz$$

$$H(z|b) = -\int_{-\infty}^{\infty} p(z|b)\log_2 p(z|b)dz$$

$$= -\frac{1}{2}\int_{-\infty}^{\infty} p(z|b=0)\log_2 p(z|b=0)dz -$$

$$\frac{1}{2}\int_{-\infty}^{\infty} p(z|b=1)\log_2 p(z|b=1)dz$$

$$= -\frac{1}{2}\int_{-\infty}^{\infty} p(z|b=0)\log_2 p(z|b=0)dz -$$

$$\frac{1}{2}\int_{-\infty}^{\infty} p(-z'|b=1)\log_2 p(-z'|b=1)dz'$$

$$= -\frac{1}{2}\int_{-\infty}^{\infty} p(z|b=0)\log_2 p(z|b=0)dz$$

$$I(b;z) = H(z) - H(z|b)$$

$$= -\int_{-\infty}^{\infty} p(z|b=0)\log_2\left(\frac{p(z|b=0) + p(z|b=1)}{2}\right)dz +$$

$$= \int_{-\infty}^{\infty} p(z|b=0)\log_2\left(\frac{2p(z|b=0)}{p(z|b=0) + p(z|b=1)}\right)dz$$

$$\left(\text{where } p(z|b=0) = \frac{1}{\sqrt{2\pi\sigma^2}}\exp\left(-\frac{(z-2/\sigma_n^2)^2}{2\sigma^2}\right)\right)$$

$$= \int_{-\infty}^{\infty} \frac{1}{\sqrt{2\pi\sigma^2}}\exp\left(-\frac{(z-2/\sigma_n^2)^2}{2\sigma^2}\right)\log_2$$

$$\left(\frac{2\frac{1}{\sqrt{2\pi\sigma^2}}\exp\left(-\frac{(z-2/\sigma_n^2)^2}{2\sigma^2}\right)}{\frac{1}{\sqrt{2\pi\sigma^2}}\exp\left(-\frac{(z-2/\sigma_n^2)^2}{2\sigma^2}\right) + \frac{1}{\sqrt{2\pi\sigma^2}}\exp\left(-\frac{(z+2/\sigma_n^2)^2}{2\sigma^2}\right)}\right)dz$$

$$= \int_{-\infty}^{\infty} \frac{1}{\sqrt{2\pi\sigma^2}}\exp\left(-\frac{(z-2/\sigma_n^2)^2}{2\sigma^2}\right)\log_2$$

$$\left(\frac{2\exp\left(-\frac{(z-2/\sigma_n^2)^2}{2\sigma^2}\right)}{\exp\left(-\frac{(z-2/\sigma_n^2)^2}{2\sigma^2}\right) + \exp\left(-\frac{(z+2/\sigma_n^2)^2}{2\sigma^2}\right)}\right)dz$$

$$= -\int_{-\infty}^{\infty} \frac{1}{\sqrt{2\pi\sigma^2}}\exp\left(-\frac{(z-2/\sigma_n^2)^2}{2\sigma^2}\right)\log_2$$

$$\left(\frac{\exp\left(-\frac{(z-2/\sigma_n^2)^2}{2\sigma^2}\right) + \exp\left(-\frac{(z+2/\sigma_n^2)^2}{2\sigma^2}\right)}{2\exp\left(-\frac{(z-2/\sigma_n^2)^2}{2\sigma^2}\right)}\right)dz$$

$$= -\int_{-\infty}^{\infty} \frac{1}{\sqrt{2\pi\sigma^2}}\exp\left(-\frac{(z-2/\sigma_n^2)^2}{2\sigma^2}\right)\log_2$$

$$\left(\frac{1}{2} + \frac{1}{2}\exp\left(-\frac{(z+2/\sigma_n^2)^2}{2\sigma^2} + \frac{(z-2/\sigma_n^2)^2}{2\sigma^2}\right)\right)dz$$

$$= -\int_{-\infty}^{\infty} \frac{1}{\sqrt{2\pi\sigma^2}}\exp\left(-\frac{(z-2/\sigma_n^2)^2}{2\sigma^2}\right)\log_2\left(\frac{1}{2} + \frac{1}{2}\exp(-z)\right)dz$$

-continued $$= \int_{-\infty}^{\infty} \frac{1}{\sqrt{2\pi\sigma^2}} \exp\left(-\frac{(z-2/\sigma_n^2)^2}{2\sigma^2}\right) dz -$$

$$\int_{-\infty}^{\infty} \frac{1}{\sqrt{2\pi\sigma^2}} \exp\left(-\frac{(z-2/\sigma_n^2)^2}{2\sigma^2}\right) \log_2(1+\exp(-z)) dz$$

$$= 1 - \int_{-\infty}^{\infty} \frac{1}{\sqrt{2\pi\sigma^2}} \exp\left(-\frac{(z-\sigma^2/2)^2}{2\sigma^2}\right) \log_2(1+\exp(-z)) dz$$

Therefore, in case of using $$LLR = \frac{2}{\sigma_n^2}(x+n),$$

the following equation 15 for mutual information applied to BPSK can be obtained.

$$I_{BPSK}(b, LLR) = 1 - \int_{-\infty}^{\infty} \frac{1}{\sqrt{2\pi}\,\sigma} e^{-\frac{(z-\sigma^2/2)}{2\sigma^2}} \log_2(1+e^{-z}) dz \quad \text{[Equation 15]}$$

$$= J(\sigma)$$

$$= J\left(\sqrt{8\frac{E_s}{N_0}}\right)$$

$$= J(2\sqrt{2SNR})$$

In addition, the following equation 16 for mutual information applied to QPSK can also be obtained.

$$I_{QPSK}(b, LLR) = 1 - \int_{-\infty}^{\infty} \frac{1}{\sqrt{2\pi}\,\sigma} e^{-\frac{\left(x-\frac{\sigma^2}{2}\right)}{2\sigma^2}} \log_2(1+e^{-x}) dz \quad \text{[Equation 16]}$$

$$= J(\sigma)$$

$$= J(\sqrt{4E_s/N_0})$$

$$= J(2\sqrt{SNR})$$

In addition, in case of $$I_m(x) = \sum_{k=1}^{K} a_k J(c_k x), \sum_{k=1}^{K} a_k = 1$$

$$J(x) \approx \begin{cases} a_1 x^3 + b_1 x^2 + c_1 x, & \text{if } x \leq 1.6363 \\ 1 - \exp(a_2 x^3 + b_2 x^2 + c_2 x + d_2), & \text{otherwise} \end{cases}$$

is achieved.

In this case, $a_1$ is denoted by $a_1 = -0.04210661$, $b_1 = 0.209252$, $c_1 = -0.00640081$ and $a_2$ is denoted by $a_2 = 0.00181492$, $b_2 = -0.142675$, $c_2 = -0.0822054$, $d_2 = 0.0549608$.

In addition, $J^{-1}(y)$ is denoted by $$J^{-1}(y) \approx \begin{cases} a_3 y^2 + b_3 y + c_3 \sqrt{y}, & \text{if } 0 \leq y \leq 0.3646 \\ a_4 \log_e[b_4(y-1)] + c_4 y, & \text{if } 0.3646 < y \leq 1. \end{cases}$$

In addition, $a_3$, $b_3$, and $c_3$ may be denoted by ($a_3 = 1.09542$, $b_3 = 0.214217$, $c_3 = 233727$, respectively. $a_4$, $b_4$, and $c_4$ may be denoted by $a_4 = -0.706692$, $b_4 = -0386013$, $c_4 = 1.75017$ respectively. Detailed description of Table 5 is as follows.

TABLE 5

| MIB Function | Numerical Approximation |
|---|---|
| $I_2(\gamma)$ (QPSK) | $J(2\sqrt{\gamma})$ (Exact) |
| $I_4(\gamma)$ (16-QAM) | $\frac{1}{2}J(0.8\sqrt{\gamma}) + \frac{1}{4}J(2.17\sqrt{\gamma}) + \frac{1}{4}J(0.965\sqrt{\gamma})$ |
| $I_6(\gamma)$ (64-QAM) | $\frac{1}{3}J(1.47\sqrt{\gamma}) + \frac{1}{3}J(0.529\sqrt{\gamma}) + \frac{1}{3}J(0.366\sqrt{\gamma})$ |

Meanwhile, LLR distribution for applying MI-ESM to a system model will hereinafter be described in detail.

FIG. 23 shows exemplary LLR distribution according to an embodiment of the present invention.

In FIG. 23, a is LLR distribution in case of SNR 10 dB, and c is LLR distribution in case of SNR=0 dB.

Figure 24:
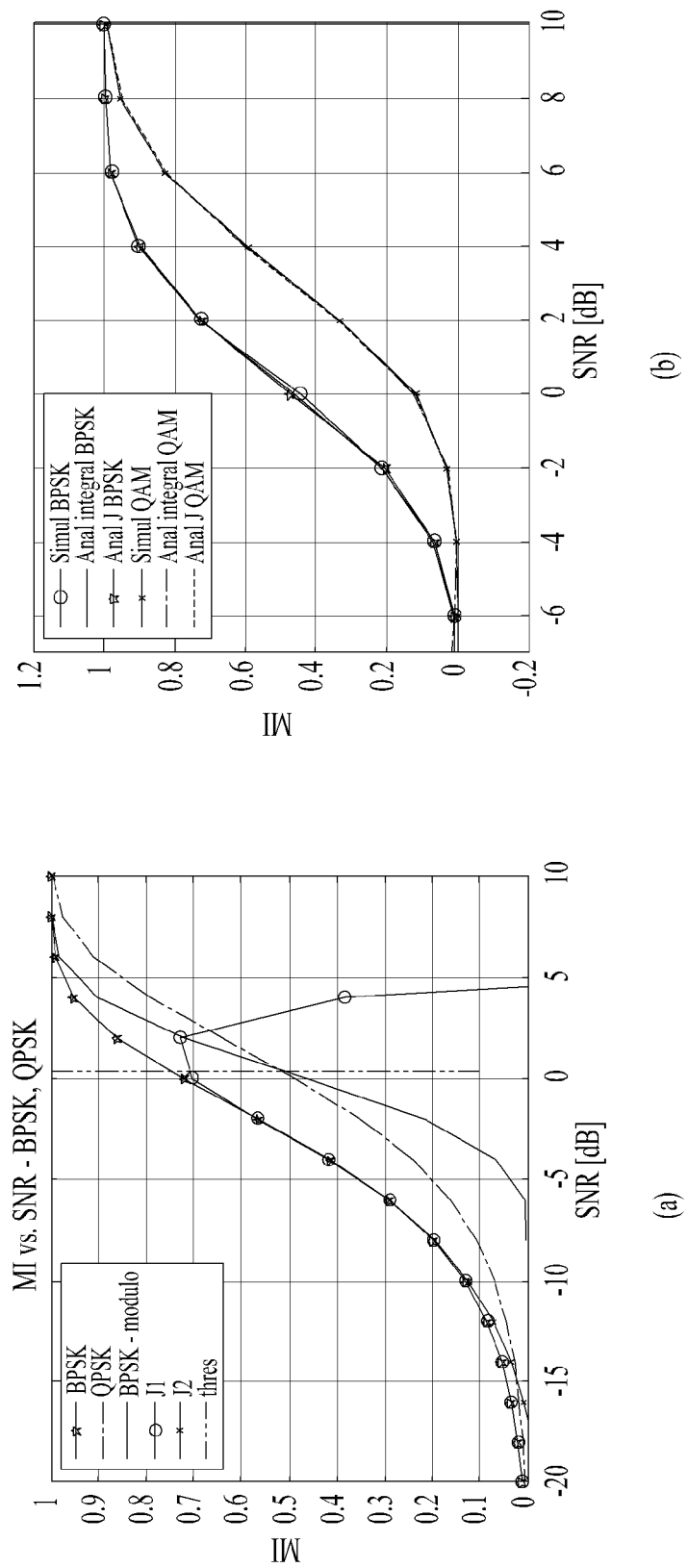
FIG. 24 shows exemplary mutual information for each SNR according to an embodiment of the present invention.

In addition, FIG. 24 shows exemplary mutual information for each SNR according to an embodiment of the present invention.

In FIG. 24(a), mutual information for SNR is classified into BPSK, QPSK, modulo-operated BPSK, J1, J2, etc.

In addition, various values shown in the following equation can be obtained as shown in FIG. 24(b).

$$I_m(x) = \sum_{k=1}^{K} a_k JM(c_k \sqrt{x}) + \sum_{k=1}^{K} b_k J(c_k \sqrt{x}), \quad \text{[Equation]}$$

$$\sum_{k=1}^{K} a_k + \sum_{k=1}^{K} b_k = 1$$

$$JM(x) \approx$$

$$\begin{cases} a_1 x^3 + b_1 x^2 + c_1 x, & \text{if } x \leq 1.1233 \\ 1 - \exp(a_2 x^3 + b_2 x^2 + c_2 x + d_2), & \text{otherwise} \end{cases}$$

$a_1 = 0.44955942, b_1 = -0.40718491, c_1 = 0.08086481$ $a_2 = 0.02141835, b_2 = -0.64506451, c_2 = 0.12573157,$ $d_2 = 0.41325381$

In addition, in case of BPSK, $I_m(x)$ is denoted by $I_m(x)$=JM(sqrt(2*SNR)). In case of QPSK, $I_m(x)$ is denoted by $I_m(x)$=JM(sqrt(SNR)).

Figure 25:
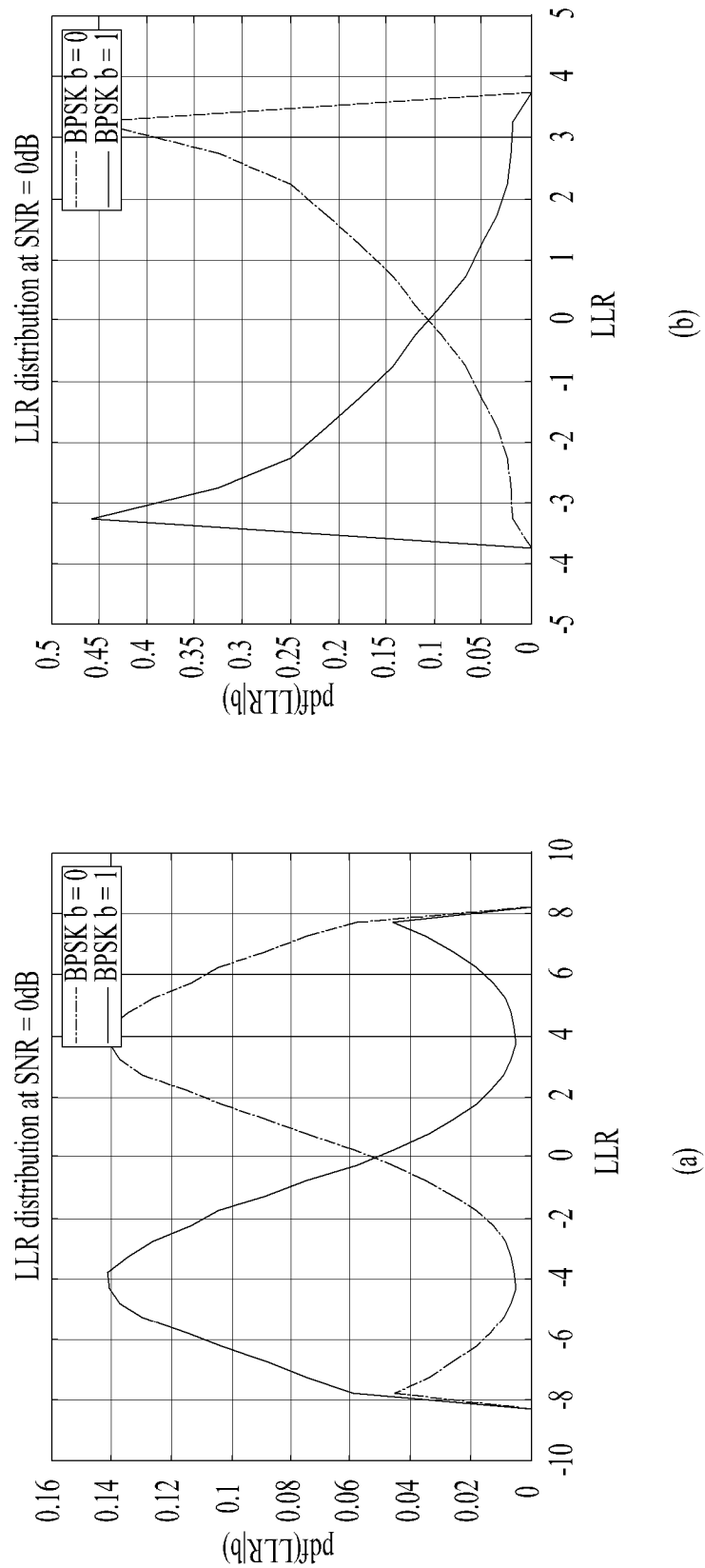
FIG. 25 shows not only LLR distribution calculated using modulo Gaussian noise but also mutual information for each SNR according to an embodiment of the present invention.

FIGS. 25(a) and 25(b) illustrate LLR distribution correctly calculated using the modulo Gaussian noise pdf.

In other words, the LLR distributions of FIGS. 25(a) and 25(b) may be based on the following expression of Equation 10.

$$z = LLR \quad \text{[Expression]}$$
$$= \log\frac{P[b=0\mid y]}{P[b=1\mid y]}$$
$$= \log\frac{P[y\mid b=0]P[b=0]P[y]}{P[y\mid b=1]P[b=1]P[y]}$$
$$= \log\frac{\frac{1}{\sqrt{2\pi\sigma_n^2}}\left(\sum_{k=-\infty}^{\infty}\exp\left(-\frac{(y-1+2Lk)^2}{2\sigma_n^2}\right)\right)}{\frac{1}{\sqrt{2\pi\sigma_n^2}}\left(\sum_{k=-\infty}^{\infty}\exp\left(-\frac{(y+1+2Lk)^2}{2\sigma_n^2}\right)\right)}$$
$$\approx \log\frac{\left(\exp\left(-\frac{(y-1)^2}{2\sigma_n^2}\right)+\exp\left(-\frac{(y+3)^2}{2\sigma_n^2}\right)\right)}{\left(\exp\left(-\frac{(y+1)^2}{2\sigma_n^2}\right)+\exp\left(-\frac{(y-3)^2}{2\sigma_n^2}\right)\right)}.$$

Considering the LLR distribution, applying the MI-ESM to the system model can acquire more stable performance.

Figure 26:
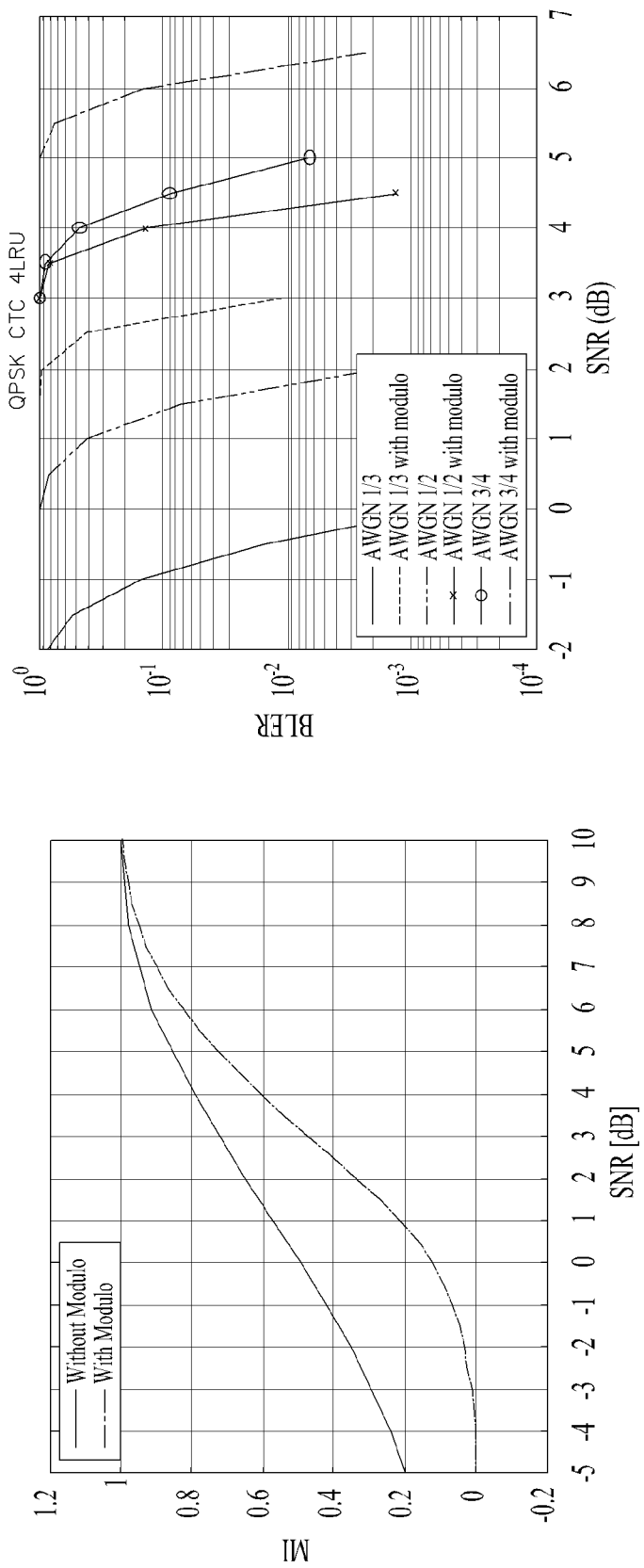
FIG. 26 shows exemplary mutual information based on application or non-application of a modulo operation according to an embodiment of the present invention.

On the other hand, FIG. 26 shows exemplary mutual information based on application or non-application of the modulo operation according to an embodiment of the present invention.

FIG. 26(a) shows mutual information for use in application or non-application of the modulo operation.

The resultant values of the graph shown in FIG. 26(a) are shown in the following Table 6.

TABLE 6

| Without | With | Difference |
|---------|------|------------|
| −1      | 2.5  | 3.5        |
| 0       | 3    | 3          |
| 1       | 3.7  | 2.7        |
| 2       | 4.3  | 2.3        |
| 3       | 5    | 2          |
| 4       | 5.7  | 1.7        |
| 5       | 6.4  | 1.4        |
| 6       | 7    | 1          |
| 7       | 8    | 1          |

In addition, FIG. 26(b) shows BLER values corresponding to SINR.

Referring to FIG. 26(b), in case of using an inverse function of mutual information where no modulo operation is used, an AWGN reference curve where no modulo operation is used may be utilized, because, after acquisition of mutual information, the mutual information is irrelevant to modulation (such as QPSK, 16QAM, 64QAM, etc. where the modulo operation is performed or not performed).

Figure 27:
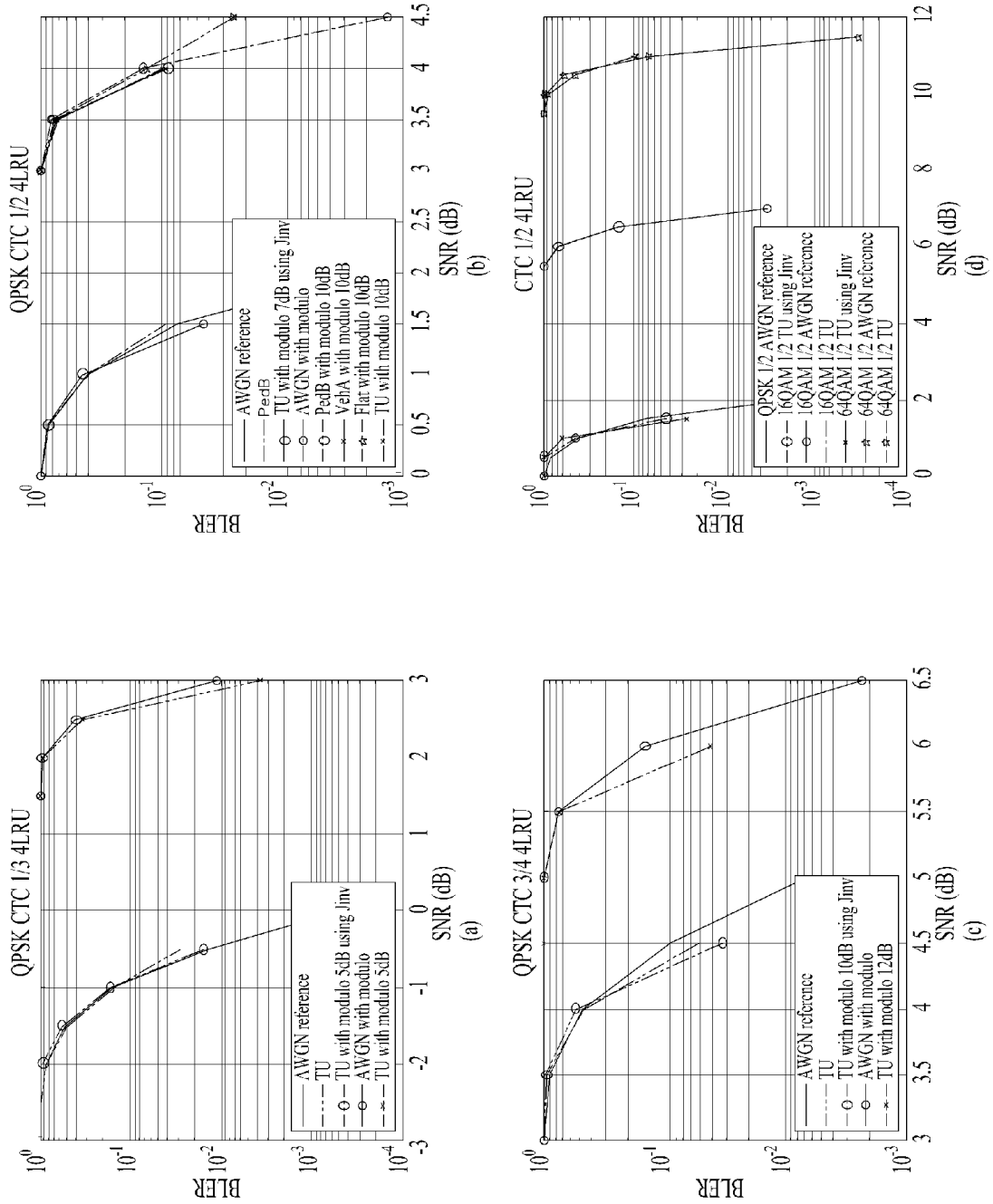
FIG. 27 shows mutual information for each SNR in a short term according to an embodiment of the present invention.

FIG. 27 shows mutual information for each SNR in a short term according to an embodiment of the present invention.

Simplified LLR calculation can be seen from the graph of FIG. 27.

Figure 28:
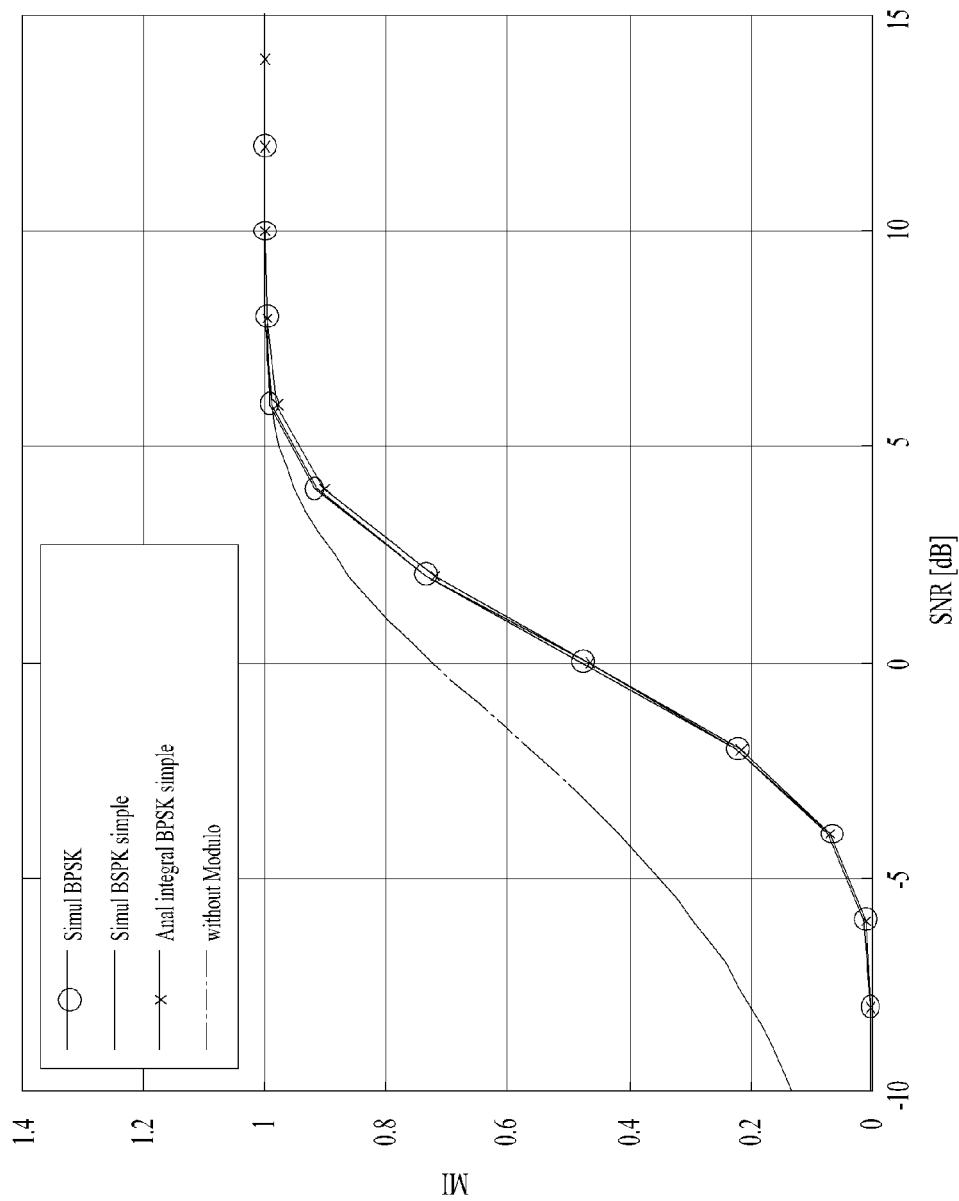
FIG. 28 shows exemplary LLR distribution caused by simple calculation according to an embodiment of the present invention.

FIG. 28 shows exemplary LLR distribution caused by simple calculation according to an embodiment of the present invention.

First, $\tilde{y}$ is denoted by the following equation.

$$\tilde{y} = \sqrt{E_s}\, y \quad \text{[Equation]}$$
$$= x + 2l(p_R + jp_I) + \sqrt{E_s}\, n$$
$$= x + 2l(p_R + jp_I) + \tilde{n}$$
$$= x + 2l(p_R + jp_I) + 2l(m_R + jm_I) + \tilde{n}', \text{ and}$$

$$\sigma_{\tilde{n}}^2 = E_s\frac{\sigma_n^2}{2}.$$

In addition, z is denoted by the following equation.

$$z = LLR \quad \text{[Equation]}$$
$$= \log\frac{P[b=0\mid \tilde{y}'_R]}{P[b=1\mid \tilde{y}'_R]}$$
$$= \log\frac{P[\tilde{y}'_R\mid b=0]P[b=0]P[\tilde{y}'_R]}{P[\tilde{y}'_R\mid b=1]P[b=1]P[\tilde{y}'_R]}$$
$$= \log\frac{\frac{1}{\sqrt{2\pi\sigma_{\tilde{n}}^2}}\left(\sum_{k=-\infty}^{\infty}\exp\left(-\frac{(\tilde{y}'_R-\alpha+2Lk)^2}{2\sigma_{\tilde{n}}^2}\right)\right)}{\frac{1}{\sqrt{2\pi\sigma_{\tilde{n}}^2}}\left(\sum_{k=-\infty}^{\infty}\exp\left(-\frac{(\tilde{y}'_R+\alpha+2Lk)^2}{2\sigma_{\tilde{n}}^2}\right)\right)}$$
$$\approx \log\frac{\left(\exp\left(-\frac{(\tilde{y}'_R-\alpha)^2}{2\sigma_{\tilde{n}}^2}\right)+\exp\left(-\frac{(\tilde{y}'_R-\alpha+2L)^2}{2\sigma_{\tilde{n}}^2}\right)\right)}{\left(\exp\left(-\frac{(\tilde{y}'_R+\alpha)^2}{2\sigma_{\tilde{n}}^2}\right)+\exp\left(-\frac{(\tilde{y}'_R+\alpha-2L)^2}{2\sigma_{\tilde{n}}^2}\right)\right)}$$

$$z = LLR(b=0) \approx$$

$$\begin{cases}
\log\dfrac{e^{\frac{|\tilde{y}'_R-\alpha+2l|^2}{2\sigma_{\tilde{n}}^2}}}{e^{\frac{|\tilde{y}'_R+\alpha|^2}{2\sigma_{\tilde{n}}^2}}} = 2\dfrac{(\tilde{y}'_R+l)(\alpha-l)}{\sigma_{\tilde{n}}^2} & \tilde{y}'_R \in (-l, \alpha-l) \\[2ex]
\log\dfrac{e^{\frac{|\tilde{y}'_R-\alpha|^2}{2\sigma_{\tilde{n}}^2}}}{e^{\frac{|\tilde{y}'_R+\alpha|^2}{2\sigma_{\tilde{n}}^2}}} = 2\dfrac{\tilde{y}'_R}{\sigma_{\tilde{n}}^2} & \tilde{y}'_R \in (\alpha-l, l-\alpha) \\[2ex]
\log\dfrac{e^{\frac{|\tilde{y}'_R-\alpha|^2}{2\sigma_{\tilde{n}}^2}}}{e^{\frac{|\tilde{y}'_R+\alpha-2l|^2}{2\sigma_{\tilde{n}}^2}}} = 2\dfrac{(\tilde{y}'_R-l)(\alpha-l)}{\sigma_{\tilde{n}}^2} & \tilde{y}'_R \in (l-\alpha, l).
\end{cases}$$

In Equation, SNR is denoted by SNR=$1/\sigma_n^2$, as shown in FIG. 28.

Figure 29:
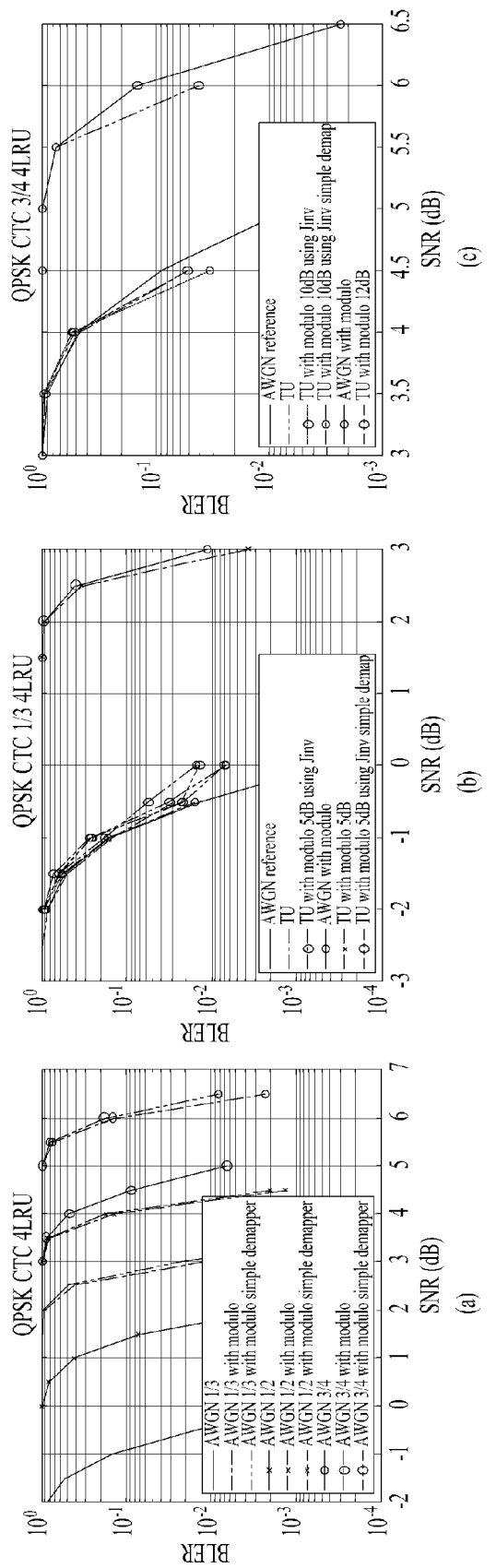
FIG. 29 shows exemplary link performance according to an embodiment of the present invention.

FIG. 29 shows exemplary link performance according to an embodiment of the present invention.

Figure 30:
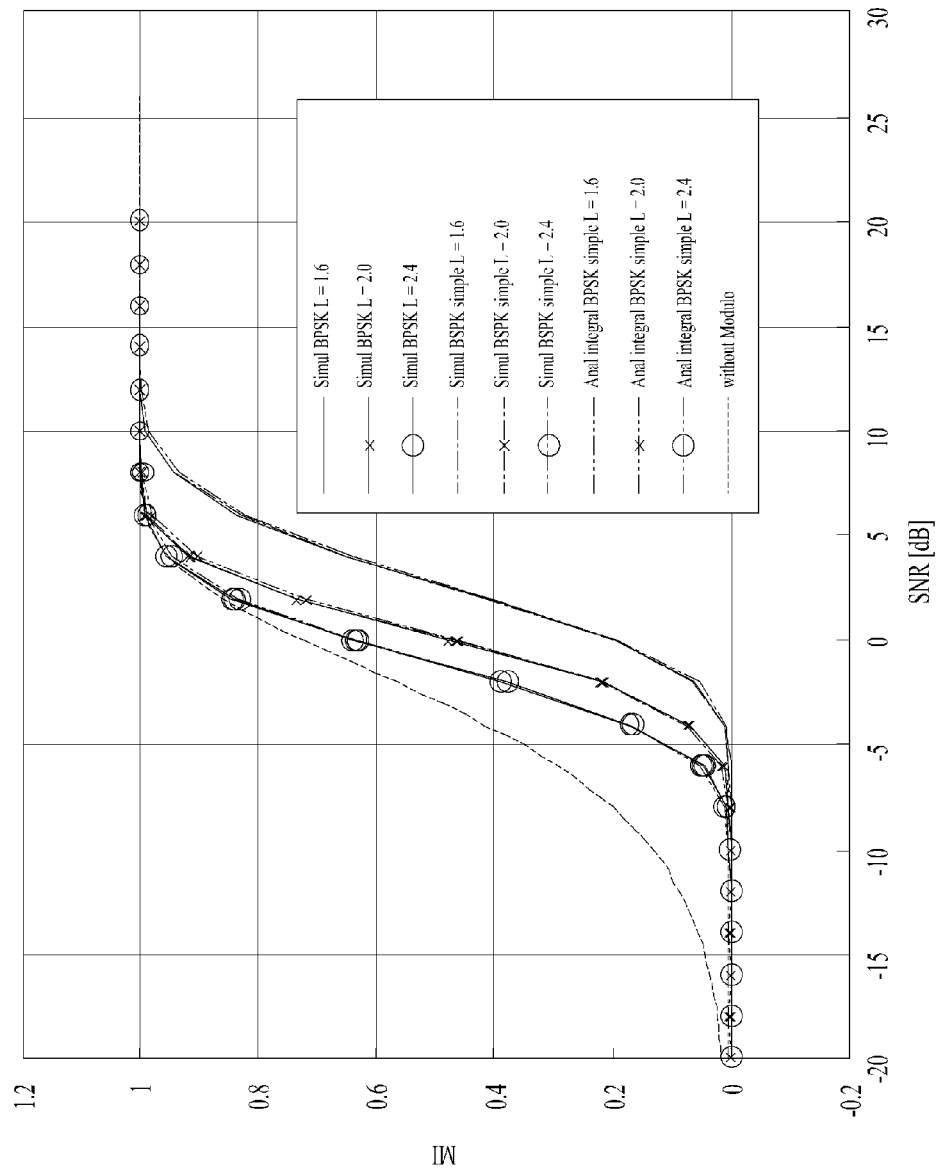
FIG. 30 shows exemplary mutual information depending upon different modulo boxes according to an embodiment of the present invention.

FIG. 30 shows exemplary mutual information depending upon different modulo boxes according to an embodiment of the present invention.

Table 7 shows mutual information obtained under the condition that SNR ranges from −20 to 27 and SNR spacing is set to 0.5.

In association with the mutual information, a first column of Table 7 shows the resultant values of QPSK, a second column shows the resultant values of 16QAM, and a third column shows the resultant values of 64QAM.

TABLE 7

| | QPSK | 16QAM | 64QAM |
|---|---|---|---|
| −20 | 0 | 0 | 0 |
| −19.5 | 0 | 0 | 0 |
| −19 | 0 | 0 | 0 |
| −18.5 | 0 | 0 | 0 |
| −18 | 0 | 0 | 0 |
| −17.5 | 0 | 0 | 0 |
| −17 | 0 | 0 | 0 |
| −16.5 | 0 | 0 | 0 |
| −16 | 0 | 0 | 0 |
| −15.5 | 0 | 0 | 0 |
| −15 | 0 | 0 | 0.0001 |
| −14.5 | 0 | 0 | 0.0002 |
| −14 | 0 | 0 | 0.0002 |
| −13.5 | 0 | 0 | 0.0002 |
| −13 | 0 | 0 | 0.0004 |
| −12.5 | 0 | 0 | 0.0004 |
| −12 | 0 | 0 | 0.0004 |
| −11.5 | 0 | 0 | 0.0005 |
| −11 | 0 | 0 | 0.0005 |
| −10.5 | 0 | 0 | 0.0007 |
| −10 | 0 | 0 | 0.0008 |
| −9.5 | 0 | 0 | 0.0005 |
| −9 | 0 | 0 | 0.001 |
| −8.5 | 0 | 0 | 0.0009 |
| −8 | 0 | 0 | 0.001 |
| −7.5 | 0 | 0 | 0.0012 |
| −7 | 0 | 0 | 0.0013 |
| −6.5 | 0 | 0 | 0.0013 |
| −6 | 0 | 0 | 0.0013 |
| −5.5 | 0 | 0 | 0.0018 |
| −5 | 0 | 0 | 0.0024 |
| −4.5 | 0 | 8.49E−05 | 0.0025 |
| −4 | 0.001843 | 0.000141 | 0.0026 |
| −3.5 | 0.006373 | 0.000382 | 0.0031 |
| −3 | 0.012682 | 0.000854 | 0.0039 |
| −2.5 | 0.021241 | 0.001506 | 0.005 |
| −2 | 0.03263 | 0.004653 | 0.0055 |
| −1.5 | 0.04756 | 0.008171 | 0.0075 |
| −1 | 0.066896 | 0.013119 | 0.0102 |
| −0.5 | 0.091694 | 0.019774 | 0.0138 |
| 0 | 0.12324 | 0.030048 | 0.0193 |
| 0.5 | 0.16109 | 0.043983 | 0.024 |
| 1 | 0.21314 | 0.060132 | 0.0339 |
| 1.5 | 0.26841 | 0.080448 | 0.047 |
| 2 | 0.33508 | 0.10462 | 0.0588 |
| 2.5 | 0.40274 | 0.13029 | 0.0759 |
| 3 | 0.47052 | 0.16094 | 0.093 |
| 3.5 | 0.53745 | 0.19024 | 0.1149 |
| 4 | 0.60249 | 0.22896 | 0.1425 |
| 4.5 | 0.66458 | 0.26599 | 0.1685 |
| 5 | 0.72268 | 0.30866 | 0.1942 |
| 5.5 | 0.77587 | 0.34616 | 0.2202 |
| 6 | 0.82339 | 0.38691 | 0.2502 |
| 6.5 | 0.86469 | 0.43192 | 0.2786 |
| 7 | 0.89953 | 0.4653 | 0.2986 |
| 7.5 | 0.92795 | 0.5227 | 0.3315 |
| 8 | 0.95029 | 0.55967 | 0.37 |
| 8.5 | 0.96714 | 0.59526 | 0.389 |
| 9 | 0.97928 | 0.63922 | 0.4274 |
| 9.5 | 0.98761 | 0.67953 | 0.4622 |
| 10 | 0.993 | 0.72051 | 0.4918 |
| 10.5 | 0.9963 | 0.76728 | 0.5223 |
| 11 | 0.99817 | 0.79341 | 0.5509 |
| 11.5 | 0.99917 | 0.82935 | 0.5898 |
| 12 | 0.99965 | 0.85712 | 0.6117 |
| 12.5 | 0.99987 | 0.87671 | 0.6538 |
| 13 | 0.99995 | 0.89958 | 0.6813 |
| 13.5 | 0.99999 | 0.91649 | 0.7052 |
| 14 | 1 | 0.94171 | 0.7299 |
| 14.5 | 1 | 0.96094 | 0.7549 |
| 15 | 1 | 0.96946 | 0.77798 |
| 15.5 | 1 | 0.97967 | 0.80106 |
| 16 | 1 | 0.9859 | 0.82414 |
| 16.5 | 1 | 0.99197 | 0.84722 |
| 17 | 1 | 0.9956 | 0.8703 |
| 17.5 | 1 | 0.99864 | 0.8878 |
| 18 | 1 | 0.99894 | 0.9053 |
| 18.5 | 1 | 0.9964 | 0.9228 |
| 19 | 1 | 0.9999 | 0.9403 |
| 19.5 | 1 | 1 | 0.9578 |
| 20 | 1 | 1 | 0.9691 |
| 20.5 | 1 | 1 | 0.9793 |
| 21 | 1 | 1 | 0.9848 |
| 21.5 | 1 | 1 | 0.9903 |
| 22 | 1 | 1 | 0.9958 |
| 22.5 | 1 | 1 | 1 |
| 23 | 1 | 1 | 1 |
| 23.5 | 1 | 1 | 1 |
| 24 | 1 | 1 | 1 |
| 24.5 | 1 | 1 | 1 |
| 25 | 1 | 1 | 1 |
| 25.5 | 1 | 1 | 1 |
| 26 | 1 | 1 | 1 |
| 26.5 | 1 | 1 | 1 |
| 27 | 1 | 1 | 1 |

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS and a UE. Such transmission/reception (Tx/Rx) relationship may be equally or similarly extended to signal Tx/Rx relationship between a BS and a relay or between a BS and a relay. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

As is apparent from the above description, signals can be effectively demapped in a wireless communication system utilizing the modulo operation. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing demapping by a receiver in a wireless communication system, the method comprising:
   receiving, from a transmitter, an input signal and first information, the first information indicating whether a first modulo operation is performed on the input signal by the transmitter;
   performing a second modulo operation on the input signal to acquire a reception signal, when the first information indicates that the first modulo operation is performed;
   generating a maximum function value representing a highest probability that the reception signal corresponds to a candidate constellation point of an extended constellation;
   generating a log-likelihood ratio (LLR) using the generated maximum function value;
   generating an effective signal to interference-plus-noise ratio (SINR) by the receiver; and
   transmitting the effective SINR to the transmitter,
   wherein the effective SINR is represented by the following equation:

$$SINR_{\mathit{eff}} = \Phi^{-1}\left\{\frac{1}{N}\sum_{n=1}^{N}\Phi(SINR_n)\right\}$$

wherein $SINR_n$ is an $n^{th}$ SINR, N is a total number of SINRs, $\Phi()$ is a function decided by mutual information of a symbol channel, and $\Phi^{-1}()$ is an inverse function of the function $\Phi()$.

2. The method according to claim 1, wherein when power of interference contained in the input signal is less than loss power caused by performing the first modulo operation, the first modulo operation is not performed.

3. The method according to claim 1, further comprising receiving, from the transmitter, information regarding a total number of used streams and information regarding an order of a first stream among the used streams.

4. The method according to claim 3, wherein when the order of the first stream is the first or last in order among the used streams, the first modulo operation is not performed.

5. The method according to claim 1, wherein the extended constellation includes a basic constellation point of a basic constellation and at least one extended constellation point.

6. The method according to claim 5, wherein the extended constellation point is a constellation point arranged by repetition of the basic constellation point.

7. The method according to claim 5, wherein the extended constellation point is located close to a modulo box through repetition of the modulo box including the basic constellation point, and is selected from among constellation points located close to basic constellation points of the basic constellation.

8. The method according to claim 1, wherein the candidate constellation point indicates a constellation point indicating the same bitstream on the extended constellation.

9. The method according to claim 1, wherein the maximum function value is denoted by the following equation:

$$P_{max}[y|x=\alpha] = \max_{(\alpha)_i}\left\{\frac{1}{\sqrt{2\pi}\,\sigma}\exp\left(-\frac{1}{2}\frac{|y-h(\alpha)_i|^2}{\sigma^2}\right)\right\}$$

wherein $\sigma^2$ is noise variance, y is a reception signal, h is a channel response, and $(\alpha)_i$ is a coordinate of the extended constellation of the extended constellation point of the candidate constellation point.

10. The method according to claim 1, wherein the LLR is denoted by the following equation:

$$LLR(b_{R,k}) = \log\frac{\sum_{\alpha \in S_{R,k}^1} P_{max}[y|x=\alpha]}{\sum_{\alpha \in S_{R,k}^0} P_{max}[y|x=\alpha]}$$

wherein $\alpha$ is one of coordinates of a constellation symbol of a constellation, $\alpha \in S_{R,k}^0$ is a symbol where a $k^{th}$ bit mapped to a real number of the coordinate $\alpha$ is set to zero (0), and $\alpha \in S_{R,k}^0$ is a symbol where a $k^{th}$ bit mapped to a real number of the coordinate $\alpha$ is set to a value of 1.

11. The method according to claim 1, wherein the mutual information is denoted by the following equation:

$$I(b, LLR) = \frac{1}{m}\sum_{i=1}^{m} I(b_i, LLR(b_i))$$

wherein $b_i$ is an $i^{th}$ coded bit, m is a total number of coded bits, and $LLR(b_i)$ is LLR of the $i^{th}$ coded bit $b_i$.

12. An apparatus for performing demapping in a wireless communication system, the apparatus comprising:
   a processor configured to:
      receive, from a transmitter, an input signal and first information, the first information indicating whether a first modulo operation is performed on the input signal by the transmitter, perform a second modulo operation on the input signal to acquire a reception signal, when the first information indicates that the first modulo operation is performed, generate a maximum function value representing a highest probability that the reception signal corresponds to a candidate constellation point of an extended constellation, generate a log-likelihood ratio (LLR) using the generated maximum value, generate an effective signal to interference-plus-noise ratio (SINR), and transmit the effective SINR to the transmitter, wherein the effective SINR is represented by the following equation:

$$SINR_{eff} = \Phi^{-1}\left\{\frac{1}{N}\sum_{n=1}^{N}\Phi(SINR_n)\right\}$$

wherein $SINR_n$ is an $n^{th}$ SINR, N is a total number of SINRs, $\Phi(\ )$ is a function decided by mutual information of a symbol channel, and $\Phi^{-1}(\ )$ is an inverse function of the function $\Phi(\ )$.

13. The apparatus according to claim 12, wherein when power of interference contained in the input signal is less than loss power caused by execution of the first modulo operation, the first modulo operation is not performed.

14. The apparatus according to claim 12, wherein the processor is further configured to receive, from the transmitter, information regarding a total number of used streams and information regarding an order of a first stream among the used streams, and wherein when the order of the first stream is the first or last in order among the used streams, the first modulo operation is not performed.

15. The apparatus according to claim 12, wherein the extended constellation includes a basic constellation point of a basic constellation and at least one extended constellation point.

16. The apparatus according to claim 12, wherein the processor decides the maximum function value using the following equation:

$$P_{max}[y|x=\alpha] = \max_{(\alpha)_i}\left\{\frac{1}{\sqrt{2\pi}\,\sigma}\exp\left(-\frac{1}{2}\frac{|y-h(\alpha)_i|^2}{\sigma^2}\right)\right\}$$

wherein $\theta^2$ is noise variance, y is a reception signal, h is a channel response, and $(\alpha)_i$ is a coordinate of the extended constellation of the extended constellation point of the candidate constellation point.

17. The apparatus according to claim 12, wherein the processor decides the LLR using the following equation:

$$LLR(b_{R,k}) = \log\frac{\sum_{\alpha\in S_{R,k}^1}P_{max}[y|x=\alpha]}{\sum_{\alpha\in S_{R,k}^0}P_{max}[y|x=\alpha]}$$

wherein $\alpha$ is one of coordinates of a constellation symbol of a constellation, $\alpha\in S_{R,k}^0$ is a symbol where a $k^{th}$ bit mapped to a real number of the coordinate a is set to zero (0), and $\alpha\in S_{R,k}^0$ is a symbol where a $k^{th}$ bit mapped to a real number of the coordinate $\alpha$ is set to a value of 1.

18. The apparatus according to claim 12, wherein the mutual information is denoted by the following equation:

$$I(b, LLR) = \frac{1}{m}\sum_{i=1}^{m}I(b_i, LLR(b_i))$$

wherein $b_i$ is an $i^{th}$ coded bit, m is a total number of coded bits, and $LLR(b_i)$ is LLR of the $i^{th}$ coded bit $b_i$.

* * * * *